(12) United States Patent
Ogami

(10) Patent No.: US 11,008,249 B2
(45) Date of Patent: May 18, 2021

(54) CHEMICALLY STRENGTHENED GLASS

(71) Applicant: AGC Inc., Chiyoda-ku (JP)

(72) Inventor: Satoshi Ogami, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 18 days.

(21) Appl. No.: 15/954,653

(22) Filed: Apr. 17, 2018

(65) Prior Publication Data

US 2018/0305251 A1    Oct. 25, 2018

(30) Foreign Application Priority Data

Apr. 20, 2017 (JP) .............................. JP2017-083319

(51) Int. Cl.
*C03C 21/00* (2006.01)
(52) U.S. Cl.
CPC ................... *C03C 21/002* (2013.01)
(58) Field of Classification Search
CPC .................................................... C03C 21/002
See application file for complete search history.

(56) References Cited

U.S. PATENT DOCUMENTS

| | | | |
|---|---|---|---|
| 2015/0030834 A1* | 1/2015 | Morey | C03C 21/002 428/220 |
| 2015/0239776 A1* | 8/2015 | Amin | C03C 21/002 428/220 |
| 2015/0368153 A1* | 12/2015 | Pesansky | C03C 21/002 428/220 |
| 2016/0102011 A1* | 4/2016 | Hu | C03C 3/093 428/155 |
| 2016/0376186 A1 | 12/2016 | Gross | |
| 2018/0065886 A1 | 3/2018 | Akatsuka et al. | |

FOREIGN PATENT DOCUMENTS

| | | |
|---|---|---|
| JP | 2013-536155 | 9/2013 |
| KR | 2016-0034297 | 3/2016 |
| WO | WO2016-185934 | 11/2016 |
| WO | WO 2016/185934 A1 | 11/2016 |

OTHER PUBLICATIONS

Toru Kishii, "Surface Stress Measurement Using Optical Waveguide Effect of Chemically Tempered Glass", Yogyo-Kyokai-Shi, 87 [3], 1979, pp. 119-126 (with English Abstract).
Toru Kishii et al., "Scattered Light Photoelasticity of Glass by Argon Ion Laser", Yogyo-Kyokai-Shi, 80 [4], 1972, pp. 137-141 (with English Abstract).

* cited by examiner

*Primary Examiner* — Laura A Auer
(74) *Attorney, Agent, or Firm* — Oblon, McClelland, Maier & Neustadt, L.L.P.

(57) ABSTRACT

A chemically strengthened glass obtained by chemically strengthening a lithium-containing aluminosilicate glass, when representing a sheet thickness of the chemically strengthened glass by t (μm) and an internal stress at a depth x (μm) from a surface of the chemically strengthened glass by σ(x) (MPa), has a value of a ratio $C=rE/rE_{limit}$ being greater than or equal to 0.7 and less than 1.0 where rE (kJ/m²) is calculated from Expression (3) described above and $rE_{limit}=16 \times t/1000+3$.

20 Claims, 19 Drawing Sheets

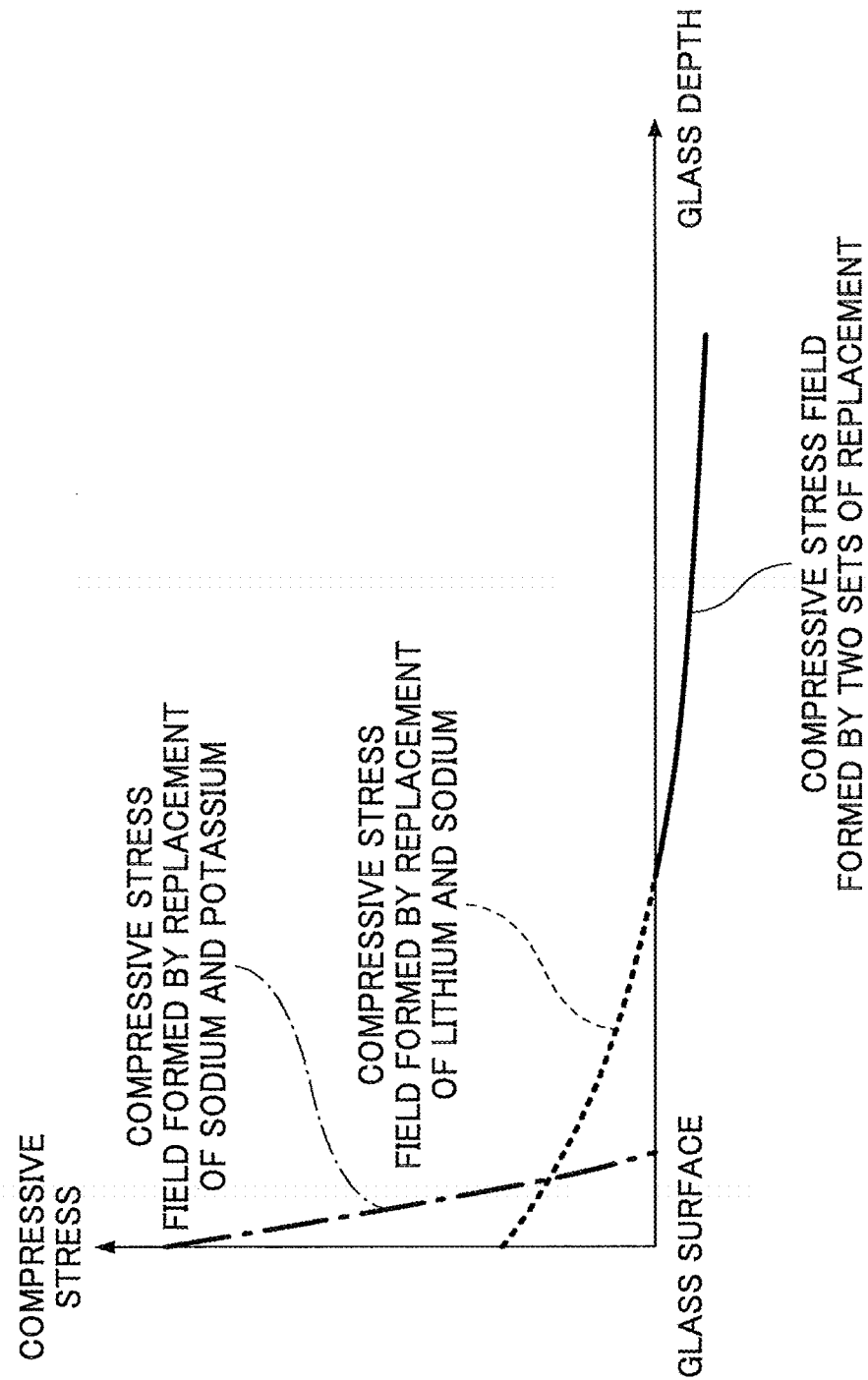

CHEMICALLY STRENGTHENED GLASS

CROSS-REFERENCE TO RELATED APPLICATIONS

This application is based upon and claims the benefit of priority of the prior Japanese Priority Application No. 2017-083319 filed on Apr. 20, 2017, the entire contents of which are hereby incorporated by reference.

BACKGROUND OF THE INVENTION

1. Field of the Invention

The present disclosure relates to a chemically strengthened glass.

2. Description of the Related Art

In electronic devices such as cellular phones and smart phones, glasses are quite often used for display units and housing cases. In order to raise the strength of the glass, what is called a "chemically strengthened glass" is used in which surface layers (ion-exchanged layers) are formed on the surface side of the glass by ion exchange to raise the strength. The surface layers include at least a compressive stress layer that exists on the surface side of the glass in which a compressive stress is generated by ion exchange, and a tensile stress layer that exists next to the compressive stress layer on the internal side of the glass in which a tensile stress is generated.

In recent years, as a chemically strengthened glass, a lithium-containing aluminosilicate glass has been drawing attention. This is because ion exchange can be easily applied to the glass; time for chemical strengthening is short; and once chemically strengthened, the glass exhibits a high surface stress value and an extended depth of the stress layer.

When chemically strengthening a lithium-containing aluminosilicate glass, the glass is immersed in a molten salt containing sodium nitrate and potassium nitrate. Here, since sodium ions tend to easily diffuse into the glass, first, sodium ions in the molten salt are exchanged with lithium ions in the glass, and next, potassium ions in the molten salt are exchanged with sodium ions in the glass.

Consequently, when viewing in the sheet thickness direction of the glass, the glass surface side contains a greater quantity of potassium ions, and inward toward the inside of the glass, sodium ions increase, and the further inner side of the glass contains a greater quantity of lithium ions.

Here, the refractive index of the glass becomes higher with a greater quantity of potassium ions, becomes lower with a greater quantity of sodium ions, and becomes higher with a greater quantity of lithium ions. In other words, when viewing in the sheet thickness direction of the glass, the refractive index of the glass is higher on the surface side, gradually becomes lower inward toward the inside of the glass, and becomes higher toward the further inside of the glass.

Here, an invention has been made that uses the stress distribution of the glass, and specifies a limit value (an upper limit of CT value) with which the performance of a chemically strengthened aluminosilicate glass can be fully brought out (International publication WO2016/185934, referred to as "Reference 1", below).

In Reference 1, for an ion-exchanged glass that has a compressive stress profile not following the error function, in which the stress is bent in the compression layer, the tensile energy density rE (by the unit of $kJ/m^2$) is derived by Expression (1) and Expression (2), based on the stress profile, and a range of $rE <= 23.3 \times t/1000 + 15$ is recommended. This is practically a proposal for an upper limit of $CT_5$.

$$CT_5 = \frac{2 \times \int_0^{DOL} \sigma(x)dx}{(t - 2 \times DOL)} \quad (1)$$

$$rE = \frac{CT_5 \times (t - 2 \times DOL)^2}{1000 \times t} \quad (2)$$

However, the example in Reference 1 merely discloses a simple aluminosilicate glass. Although the proposal may be applied to a lithium-containing aluminosilicate glass, it does not necessarily indicate a limit value of the lithium-containing aluminosilicate glass precisely.

Therefore, it has been not possible for a lithium-containing aluminosilicate glass chemically strengthened by such a conventional method, to exhibit the inherent performance of the glass, and there has been a problem that the glass is short of the CS value or DOL value.

SUMMARY OF THE INVENTION

According to an embodiment, a chemically strengthened glass obtained by chemically strengthening a lithium-containing aluminosilicate glass, when representing a sheet thickness of the chemically strengthened glass by t (μm) and an internal stress at a depth x (μm) from a surface of the chemically strengthened glass by $\sigma(x)$ (MPa), has a value of a ratio $C = rE/rE_{limit}$ being greater than or equal to 0.7 and less than 1.0 where rE ($kJ/m^2$) is calculated from Expression (3) described later and $rE_{limit} = 16 \times t/1000 + 3$.

BRIEF DESCRIPTION OF THE DRAWINGS

FIG. 21 is a diagram exemplifying a stress distribution of a chemically strengthened glass according to an embodiment;

DESCRIPTION OF THE PREFERRED EMBODIMENTS

Figure 1:
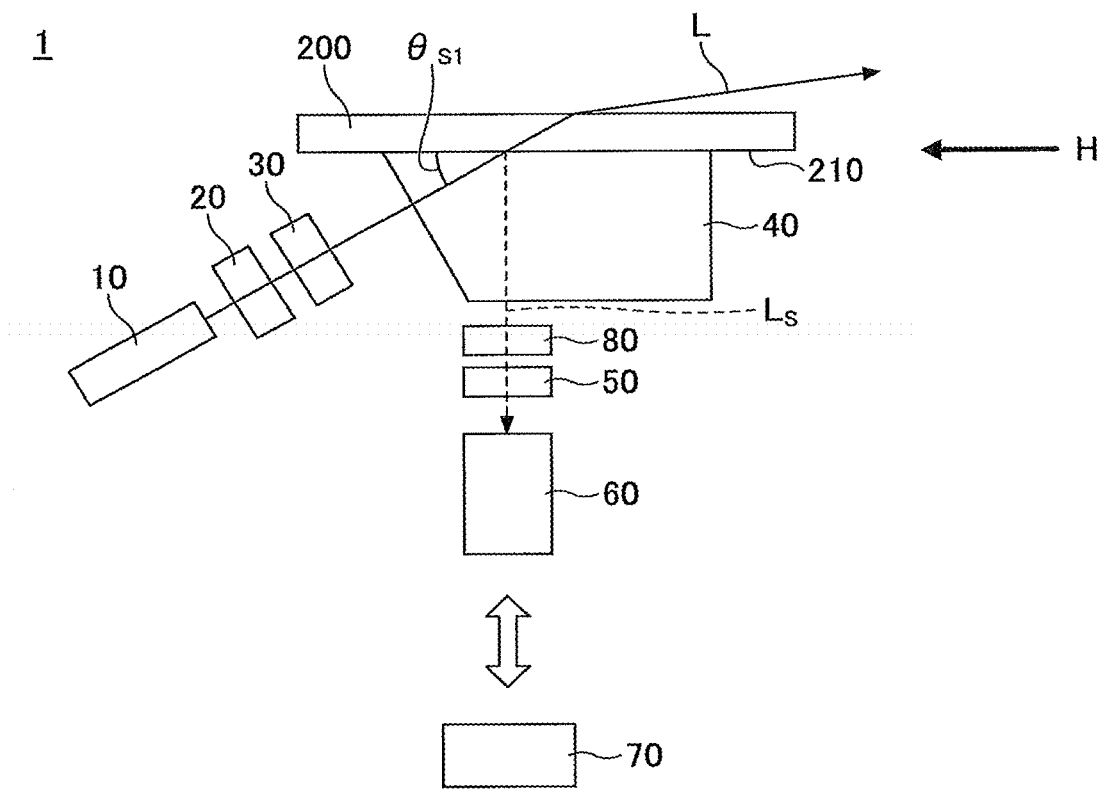
FIG. 1 is a diagram illustrating a first example of a stress profile measuring device.

In the following, embodiments will be described with reference to the drawings. Throughout the drawings, the same elements may be assigned the same reference symbols, and duplicated description may be omitted.

According to an embodiment of the disclosed technologies, it is possible to provide a chemically strengthened glass whose inherent performance can be fully exhibited.

<Chemically Strengthened Glass>

A chemically strengthened glass according to an embodiment is normally plate-shaped, which may be a flat sheet or a glass sheet processed to have a curvature. The chemically strengthened glass according to the embodiment is a glass sheet formed to have a flat shape by any one of the known glass forming methods including a float glass process, a fusion process, and a slot down draw process. It is favorable for the chemically strengthened glass to have the liquid phase viscosity greater than or equal to 130 dPa·s.

The chemically strengthened glass according to the embodiment may be used as a cover glass and a touch sensor glass of a touch panel display included in information devices such as a tablet PC, a note PC, a smart phone, and an electronic book reader; a cover glass of a liquid crystal television and a PC monitor; a cover glass of an automobile instrument panel; a cover glass for a solar battery; an interior material of a building material; a double glazing glass used for windows of a building and a house; and the like.

The chemically strengthened glass according to the embodiment has dimensions that can be formed by an existing forming method. In other words, if the glass is formed by a float glass process, a ribbon-shaped continuous glass is obtained having the width following the float forming. Also, the chemically strengthened glass according to the embodiment is finally cut to have a size suitable for the purpose of use.

In other words, the size may correspond to a display of a tablet PC or a smart phone, a cover glass for a solar battery, or any other use. Although the chemically strengthened glass according to the embodiment is cut to have a rectangular shape in general, there is no problem for the glass to have any other shape such as a circle or a polygon, or to have drilling applied.

It is favorable for the sheet thickness t of the chemically strengthened glass according to the embodiment to be 1500 μm or less in order to contribute to weight reduction. The sheet thickness t is more favorably 1000 μm or less, 700 μm or less, 500 μm or less, 400 μm or less, 300 μm or less, 200 μm or less, or 100 μm or less.

The chemically strengthened glass according to the embodiment includes a compressive stress layer on the surface, formed by an ion-exchange process. Since a higher compressive stress makes the glass less breakable, the surface compressive stress (CS) of the chemically strengthened glass is favorably 600 MPa or greater, and is more favorably 700 MPa or greater, 800 MPa or greater, 850 MPa or greater, 900 MPa or greater, 950 MPa or greater, 1000 MPa or greater, 1050 MPa or greater, 1100 MPa or greater, 1150 MPa or greater, 1200 MPa or greater, 1300 MPa or greater, 1400 MPa or greater, or 1500 MPa or greater.

Also, when using the chemically strengthened glass, if a chip is formed with the depth exceeding a value of DOL, which represents the depth of the compressive stress layer, it may lead to a fracture of the chemically strengthened glass. Therefore, a deeper value of DOL of the chemically strengthened glass is favorable, which is favorably 30 μm or greater, and is more favorably 40 μm or greater, 50 μm or greater, 55 μm or greater, 60 μm or greater, 65 μm or greater, 70 μm or greater, 75 μm or greater, 80 μm or greater, 85 μm or greater, 90 μm or greater, 95 μm or greater, 100 μm or greater, 110 μm or greater, 120 μm or greater, 130 μm or greater, 140 μm or greater, or 150 μm or greater.

A greater value of the internal tensile stress, or the central tension, CT of the chemically strengthened glass is favorable because CS can be made greater and DOL can be made deeper. In other words, to make CS or DOL greater, it is inevitably necessary to make CT greater. For example, for a glass having virtually the same stress profile, a 10% greater value of CS or DOL (or a value 1.1 times greater) requires the value of CT increased by approximately 10% in general. Therefore, by making the value of CT greater, it is possible to bring CS and DOL closer to more favorable values.

A greater value of the internal energy density rE of the chemically strengthened glass is favorable because CS can be made greater for the same value of DOL.

Here, since the chemically strengthened glass of the embodiment is a lithium-containing aluminosilicate glass, the central tension CT and the internal energy density of the glass cannot be derived by Expression (1) and Expression (2) used in the conventional method. A derivation method for a lithium-containing chemically strengthened glass will be described later.

In order to achieve a greater CS value and a deeper DOL value, the chemically strengthened glass according to the embodiment has two sets of elements exchanged through chemical strengthening, where one exchange is between sodium and potassium, and the other is between lithium and sodium, and thereby, the stress profile of the glass is bent as a whole as illustrated in FIG. 21. A problem here is that it is difficult to precisely measure the stress distribution for each of the two stress fields because the refractive index and the photoelastic constant are changed depending on the exchanged region. Therefore, it is favorable to measure a tensile stress field in which virtually no exchange occurs through chemical strengthening.

Also, in order to prevent the chemically strengthened glass according to the embodiment from explosively breaking into pieces, a compressive stress value at the half depth of the DOL value of the glass is favorably 40% or less, more favorably 30% or less, further favorably 20% or less, or especially favorably 10% or less, with respect to the surface stress value (CS value)

Also, the position at which the half value (HW) of the surface stress value (CS value) is realized in the chemically strengthened glass according to the embodiment, is favorably 8 μm or less, more favorably 7 μm or less, further favorably 6 μm or less, or most favorably 5 μm or less. The position of 8 μm or less at which the half value (HW) of the surface stress value (CS value) is realized, enables to achieve a great CS value and a deep DOL value, and thereby, even when the glass fractures, it is possible to prevent the glass from explosively breaking into pieces.

The internal energy density rE of the chemically strengthened glass according to the embodiment is defined by Expression (3) where σ(x) represents a compressive stress value (MPa) at a position x (μm) in the depth direction of the chemically strengthened glass; DOL represents the depth (μm) of the compressive stress layer; and t represents the sheet thickness (μm). Note that it is possible to rephrase that DOL represents a depth at which the central tension starts working.

$$rE = \frac{2 \times \int_{DOL}^{t/2} |\sigma(x)| dx \times (t - 2 \times DOL)}{1000 \times t} \quad (3)$$

In general, the internal energy E caused by distortion can be obtained by (stress)×(distortion)/2×(load surface area S). Applying this to a chemically strengthened glass, E is represented by E=CT×(distortion)/2×(tensile stress layer thickness). Here, since the distortion is inversely proportional to the sheet thickness and is inversely proportional to the tensile stress layer, it is possible to represent E∝CT×(tensile stress layer thickness)×(tensile stress layer thickness)/(sheet thickness). Here, considering the dimensions, defining rE as rE[kJ/m$^2$]=CT[MPa]×(tensile stress layer thickness)[μm]×(tensile stress layer thickness)[μm]/{(sheet thickness) [μm]×1000}, rE can be treated in the same way as with the internal energy. Thereupon, in the present specification, rE defined as such will be referred to as the internal energy density, below. When this internal energy density rE is high, if a crack is generated, new cracks will be generated one after another near the crack, and the glass breaks into fragments.

If satisfying Expression (4), the internal energy density rE obtained by Expression (3) makes the glass less likely to scatter in fine fragments when the glass breaks.

$$rE \leq 16 \times t/1000 + 3 (kJ/m^2) \quad (4)$$

Here, the right-hand side of Expression (4) is an upper limit value of the internal energy density rE of the chemically strengthened glass, which was found out by the inventors of the present application as a result of diligent examination. In the case where a lithium-containing aluminosilicate glass is chemically strengthened by two sets of exchange described above, it is possible to manage the strength of the chemically strengthened glass, by controlling the internal energy density rE to be contained within a range of numerical values that satisfy Expression (4). The basis of the right-hand side of Expression (4) will be described later.

(Chemical Strengthening Process)

In a chemical strengthening process, a glass substrate is immersed in a molten alkaline metal salt (for example, potassium nitrate salt and sodium nitrate salt) that contains alkali metal ions (K ions and Na ions in the case of a lithium-containing aluminosilicate glass) having greater ion radii, so that metal ions (Na ions and Li ions in the case of a lithium-containing aluminosilicate glass) having smaller ion radii in the glass are exchanged with the metal ions having the greater ion radii in the molten salt contacting the glass.

Such a chemical strengthening process can be performed, for example, by immersing a glass sheet in a molten alkaline metal salt at 350 to 500° C. for 5 minutes to 60 hours.

As a molten salt for performing an ion-exchange process, for example, an alkali nitrate salt such as potassium nitrate salt, potassium sulfate salt, and potassium carbonate salt; alkali sulfate; alkali chloride salt; and the like may be listed. One of these molten salts may be used alone or two or more of the salts may be used in combination. Also, in order to adjust a chemical strengthening characteristic, a salt containing sodium (Na ions) and lithium (Li ions) may be mixed. Also, the process may be performed multiple times by changing the conditions.

In the chemically strengthened glass according to the embodiment, the process conditions of the chemical strengthening process are not limited in particular; optimal conditions may be selected in consideration of characteristics of the glass, molten salts, and the like.

The chemically strengthened glass according to the embodiment is manufactured, for example, by the following processes (1) to (3). In the following, each of the processes will be described.

(1) First chemical strengthening process that applies an ion-exchange process to the glass so as to form a compressive stress layer on the glass surface Process (1) is a process in which the glass to be chemically strengthened is brought into contact with molten salts (for example, potassium salt and sodium salt) containing alkali metal ions having greater ion radii than alkali metal ions (for example, Na ion and Li ion) contained in the glass, within a temperature range not exceeding the transition temperature of the glass, so that ion exchange takes place between alkali metal ions in the glass and the alkali metal ions having greater ion radii in the alkali metal salt, to generate a compressive stress in the glass surface owing to the difference of occupied surface areas of the alkali metal ions, and to form a compressive stress layer.

In Process (1), the processing temperature and the processing time for having the glass contact the molten salt containing alkali metal ions, are adjusted properly depending on the composition of the glass and the molten salt. Normally, the heating temperature of the molten salt is favorably 350° C. or higher, and is more favorably 370° C. or higher. Also, normally, the temperature is favorably 500° C. or lower, and is more favorably 450° C. or lower. The heating temperature of the molten salt being 350° C. or higher can prevent the effect of the chemical strengthening from declining due to a reduced ion-exchange rate. Also, the temperature being 500° C. or lower can inhibit decomposition and degradation of the molten salt.

In order to give a sufficiently great compressive stress, normally, the time for having the glass contact the molten salt in Process (1) is favorably 0.5 hours or longer, and is more favorably 1 hour or longer, 2 hours or longer, 3 hours or longer, or 4 hours or longer. Also, since a long-time ion-exchange process decreases the productivity and drops the compressive stress value due to relaxation, the time is favorably 200 hours or less, and is more favorably 150 hours or less, 100 hours or less, 90 hours or less, or 80 hours or less.

(2) Glass Heating Process

Process (2) is a process in which the glass obtained by Process (1) having a compressive stress layer formed on the glass surface, is heated so as to move greater alkali metal ions that exist in the compressive stress layer, for example, potassium ions and sodium ions, in a direction from the surface of the glass toward the inside of the glass, to move the deepest part of the compressive stress layer in a direction from the surface of the glass toward the inside of the glass. This process may be skipped.

By having the deepest part of the compressive stress layer move in a direction from the surface of the glass toward the inside of the glass, the compressive stress on the glass surface declines, but the compressive stress layer is favorably formed having the depth of 30 μm or greater from the glass surface.

The temperature for heating the glass is a temperature lower than the glass transition point by 50° C. or more, more favorably by 70° C. or more, or further favorably by 100° C. or more. Heating the glass at a temperature lower than the glass transition point by 50° C. or more can prevent stress relaxation of the glass.

It is favorable to adjust the time for heating the glass properly depending on the heating temperature, which is favorably 30 to 2000 minutes normally, and more favorably 30 to 300 minutes.

(3) Second Chemical Strengthening Process of Applying an Ion-Exchange Process to the Glass to Change the Compressive Stress Layer on the Glass Surface Process (3) is a process of applying an ion-exchange process to the glass obtained at Process (2), to change the compressive stress layer on the glass surface. Performing again ion exchange in Process (3), it is possible to change the glass surface and the inner compressive stress layer. The ion-exchange process in Process (3) may be performed by virtually the same method as in the ion-exchange process in Process (1) described above, or may be performed by another method. Also, another molten salt may be used.

In Process (3), the processing temperature and the processing time for having the glass contact the molten salt containing alkali metal ions are adjusted properly depending on the composition of the glass and the molten salt. Normally, the heating temperature of the molten salt is favorably 350° C. or higher, and is more favorably 370° C. or higher. Also, normally, the temperature is favorably 500° C. or lower, and is more favorably 450° C. or lower. The heating temperature of the molten salt being 350° C. or higher can prevent the effect of the chemical strengthening from declining due to a reduced ion-exchange rate. Also, the temperature being 500° C. or lower can inhibit decomposition and degradation of the molten salt.

In order to generate a sufficient compressive stress, normally, the time for having the glass contact the molten salt in Process (3) is favorably 5 minutes or longer, and is more favorably 6 minutes or longer, 7 minutes or longer, 8 minutes or longer, 9 minutes or longer, or 10 minutes or longer. Also, since a long-time ion-exchange process decreases the productivity and drops the compressive stress value due to relaxation, the time is favorably 5 hours or less, and is more favorably 3 hours or less, 2 hours or less, or 1 hour or less.

Processes (1) to (3) may be performed as consecutive processes, for example, processes applied online and sequentially to a glass ribbon continuously moving in a glass sheet manufacturing process, or may be performed discontinuously and online. Also, from the viewpoint of operational efficiency, it is favorable to skip Process (2).

As the molten salt for performing the ion-exchange process, it is favorable to use a processed salt that contains at least potassium ions or sodium ions. As such a processed salt, for example, a salt that contains potassium nitrate by 50 mass % or greater may be considered favorably. Also, a mixed molten salt may contain other components. The other components include, for example, alkali sulfate such as sodium sulfate and potassium sulfate; alkali chloride such as sodium chloride and potassium chloride; and the like.

<Measuring Method of Stress Profile (1)>

A device and a method for measuring a stress profile of a chemically strengthened glass according to the above embodiment will be described in detail.

FIG. 1 is a diagram illustrating a first example of a stress profile measuring device. As illustrated in FIG. 1, a stress measurement device 1 includes a laser light source 10, a polarization member 20, a variable polarization phase difference member 30, a light feeding member 40, a light conversion member 50, an imaging element 60, an arithmetic unit 70, and a light wavelength selection member 80.

An object designated with a code 200 is a chemically strengthened glass to be measured. The chemically strengthened glass 200 is, for example, a glass to which a strengthening process has been applied by a chemical strengthening method.

The laser light source 10 is placed so that a laser light L from the light feeding member 40 enters the surface layer of the chemically strengthened glass 200, and the variable polarization phase difference member 30 is interposed between the laser light source 10 and the light feeding member 40.

As the laser light source 10, it is possible to use, for example, a semiconductor laser, a helium-neon laser, or an argon laser. A semiconductor laser is normally polarized, and the semiconductor laser having the wavelength of 405 nm, 520 nm, 630 nm, or the like has been put into practical use. A laser light having a shorter wavelength can make the beam diameter narrower, and hence, can make the spatial resolution higher.

In order to raise the resolution in the depth direction of the chemically strengthened glass 200, it is favorable that the position of the minimum beam diameter of the laser light is located within the ion-exchanged layer of the chemically strengthened glass 200, and the minimum beam diameter is 20 μm or less. It is more favorable that the position of the minimum beam diameter of the laser light is located on the surface 210 of the chemically strengthened glass 200. Note that since the beam diameter of the laser light corresponds to the resolution in the depth direction, the beam diameter needs to be less than or equal to the required resolution in the depth direction. Here, the beam diameter means $1/e^2$ times the width (approximately 13.5%) of the beam obtained when the brightness of the center of the beam becomes the maximum, and in the case of an elliptical shape or a sheet shape, the beam diameter means the minimum width. However, in the latter case, the minimum width of the beam diameter needs to be oriented in the glass depth direction.

The polarization member 20 is interposed between the laser light source 10 and the variable polarization phase difference member 30 when necessary. Specifically, in the case where the laser light L emitted by the laser light source 10 is not polarized, the polarization member 20 is interposed between the laser light source 10 and the variable polarization phase difference member 30. In the case where the laser light L emitted by the laser light source 10 is polarized, the polarization member 20 may be interposed or may not be interposed. Also, the laser light source 10 and the polarization member 20 are installed so that the plane of polarization of the laser light L is tilted by 45° with respect to the surface 210 of the chemically strengthened glass 200. As the polarization member 20, it is possible to use, for example, a polarizing plate or the like that is placed in a rotatable state, or any other member having substantially the same function may be used.

The light feeding member 40 is laid on the surface 210 of the chemically strengthened glass 200 to be measured, in a state optically contacting each other. The light feeding member 40 has a function to enter light from the laser light source 10 into the chemically strengthened glass 200. As the light feeding member 40, it is possible to use, for example, a prism made of an optical glass. In this case, in order for rays of light to optically enter the surface 210 of the chemically strengthened glass 200 through the prism, the refractive index of the prism needs to be nearly the same (within ±0.2) as the refractive index of the chemically strengthened glass 200.

A liquid having nearly the same refractive index as the refractive index of the chemically strengthened glass 200 may be sandwiched between the light feeding member 40 and the chemically strengthened glass 200. This makes it possible to have the laser light L efficiently enter the chemically strengthened glass 200. In this regard, a detailed description will be given in a section of "Measuring method of stress profile (5)".

The laser light L transmitting through the chemically strengthened glass 200 generates a small quantity of scattered light LS. The brightness of the scattered light LS changes by the polarization phase difference of a part where the laser light L is scattered. Also, the laser light source 10 is installed so that the polarization direction of the laser light L is tilted by 45° (within ±5°) with respect to the surface 210 of the chemically strengthened glass 200 as designated by $\theta_{s2}$ in FIG. 2. Therefore, double refraction is caused by the photoelasticity effect of the stress imposed in a direction inward from the surface of the chemically strengthened glass 200, and as the laser light L travels in the chemically strengthened glass 200, the polarization phase difference changes, which accompanies change in the brightness of the scattered light LS. Note that the polarization phase difference is a phase difference (retardation) generated by double refraction.

Also, the laser light L is set so that $\theta_{s1}$ becomes greater than or equal to 10° and less than or equal to 30° with respect to the surface 210 of the chemically strengthened glass. This is because $\theta_{s1}$ below 10° makes the laser light propagate through the glass surface due to the optical waveguide effect, and it becomes impossible to take information of the inside of the glass. Conversely, $\theta_{s1}$ exceeding 30° is not favorable for the measuring method because the depth resolution inside the glass with respect to the optical path length of the laser declines. Therefore, it is favorably set to $\theta_{s1}=15°\pm5°$.

Figure 2:
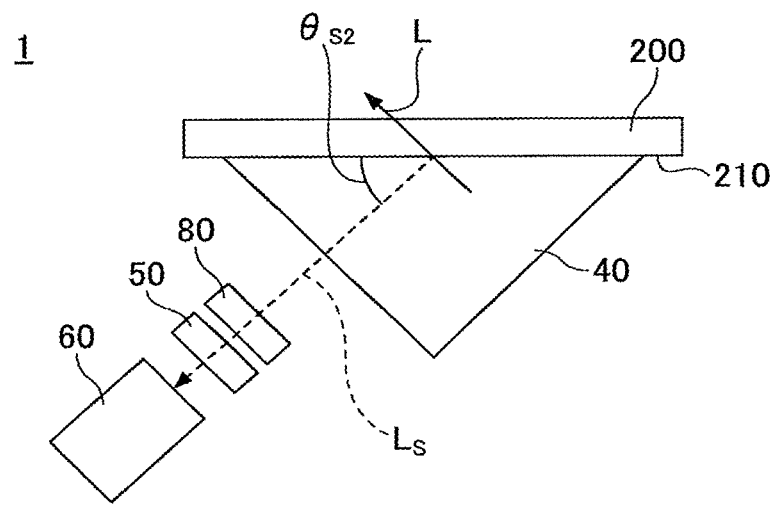
FIG. 2 is a diagram viewing a stress measurement device 1 in a direction H in FIG. 1.

Next, the imaging element 60 will be described using FIG. 2. FIG. 2 is a diagram viewing the stress measurement device 1 in a direction H in FIG. 1, and is a diagram illustrating a positional relationship of the imaging element 60 with respect to the other components. Since the polarized laser light L is incident on the surface 210 of the chemically strengthened glass 200 at the angle of 45°, the scattered light LS is also emitted at the 45° angle with respect to the surface 210 of the chemically strengthened glass 200. Therefore, in order to capture the scattered light LS emitted at the 45° angle with respect to the surface of the chemically strengthened glass, the imaging element 60 is installed in the 45° direction with respect to the surface 210 of the chemically strengthened glass 200 in FIG. 2. In other words, in FIG. 2, $\theta_{s2}=45°$.

Also, between the imaging element 60 and the laser light L, the light conversion member 50 is interposed so that an image of the scattered light LS caused by the laser light L forms an image on the imaging element 60. As the light conversion member 50, it is possible to use, for example, a convex lens made of glass or lenses combining multiple convex lenses and concave lenses.

Also, by configuring multiple combined lenses as a telecentric lens in which the chief ray is parallel to the optical axis, among the scattered light rays scattered in all directions from the laser light L, it is possible to form an image only with light rays mainly scattered in the 45° direction (the direction toward the imaging element) with respect to the glass surface of the chemically strengthened glass 200, which is effective in reducing unnecessary light rays that would cause diffused reflection on the glass surface.

Also, the light wavelength selection member 80 may be interposed between the laser light L and the imaging element 60 to prevent transmission of a part of the laser light by 50% or greater, or favorably by 90%, at least for the light whose wavelength is greater than or equal to +100 nm or less than or equal to −100 nm relative to the wavelength of the laser light. By interposing the light wavelength selection member 80, it becomes possible to remove fluorescence light generated by the laser light L and light coming from the outside, so as to collect only the scattered light LS onto the imaging element 60. As the light wavelength selection member 80, it is possible to use, for example, a bandpass filter or a short pass filter made of multi-layered dielectric films.

As the imaging element 60, it is possible to use, for example, a CCD (Charge Coupled Device) or a CMOS (Complementary Metal Oxide Semiconductor) sensor. Although not illustrated to FIG. 1 and FIG. 2, an element such as a CCD or a CMOS sensor is connected to a control circuit that controls the element to output electric signals of an image out of the element; a digital image data generator circuit that converts the electric signals into digital image data; and a digital recording device that records multiple sheets of digital image data. Furthermore, the digital image data generator circuit and the digital recording device are connected to the arithmetic unit 70.

The arithmetic unit 70 takes as input image data from the imaging element 60, or from the digital image data generator circuit or the digital recording device connected to the imaging element 60, and includes a function to execute image processing and numerical computation. The arithmetic unit 70 may be configured to include other functions (for example, a function to control the quantity of light of the laser light source 10 and/or the exposure time). The arithmetic unit 70 may be configured, for example, to include a CPU (Central Processing Unit), a ROM (Read-Only Memory), a RAM (Random Access Memory), a main memory, and the like.

In this case, various functions of the arithmetic unit 70 can be implemented by loading a program recorded in the ROM or the like into the main memory, and having the CPU run the program. When necessary, the CPU of the arithmetic unit 70 can read out data from the RAM, or store the data in the RAM. However, a part or the entire arithmetic unit 70 may be implemented by only hardware. Also, the arithmetic unit 70 may be physically constituted with multiple devices and the like. As the arithmetic unit 70, for example, a personal computer may be used. Also, the arithmetic unit 70 may have functions of the digital image data generator circuit and the digital recording device.

The variable polarization phase difference member 30 changes in time the polarization phase difference when the light enters the chemically strengthened glass 200. The polarization phase difference to be changed corresponds to the wavelength λ of the laser light multiplied by unity or greater. The polarization phase difference needs to be uniform with respect to the wavefront of the laser light L. For example, a crystal wedge generates a non-uniform polarization phase difference in directions of the sloped surfaces of the wedge, and hence, the wavefront of the laser light is not uniform. Therefore, it is not favorable to use a crystal wedge as the variable polarization phase difference member 30.

As the variable polarization phase difference member 30 that can generate the polarization phase difference uniformly on the wavefront of the laser light, and can variably change the polarization phase difference by 1λ or greater, for example, a liquid crystal element may be considered. A liquid crystal element can variably change the polarization phase difference with a voltage applied to the element, for example, within a range of 3 to 6 times the wavelength in the case of the wavelength of the laser light being 630 nm. In a liquid crystal element, the maximum value of the polarization phase difference that can be variably changed by the applied voltage is determined by the dimension of the cell gap.

Since a normal liquid crystal element has a cell gap of several μm, the maximum polarization phase difference is around ½λ (several hundred nm). Also, a change greater than that is not required for a display or the like using a liquid crystal. In contrast, a liquid crystal element used in the embodiment needs to be capable of variably changing the polarization phase difference, for example, in the case of the wavelength of the laser light being 630 nm, approximately 2000 nm or three times greater, which requires a cell gap of 20 to 50 μm.

Figure 3:
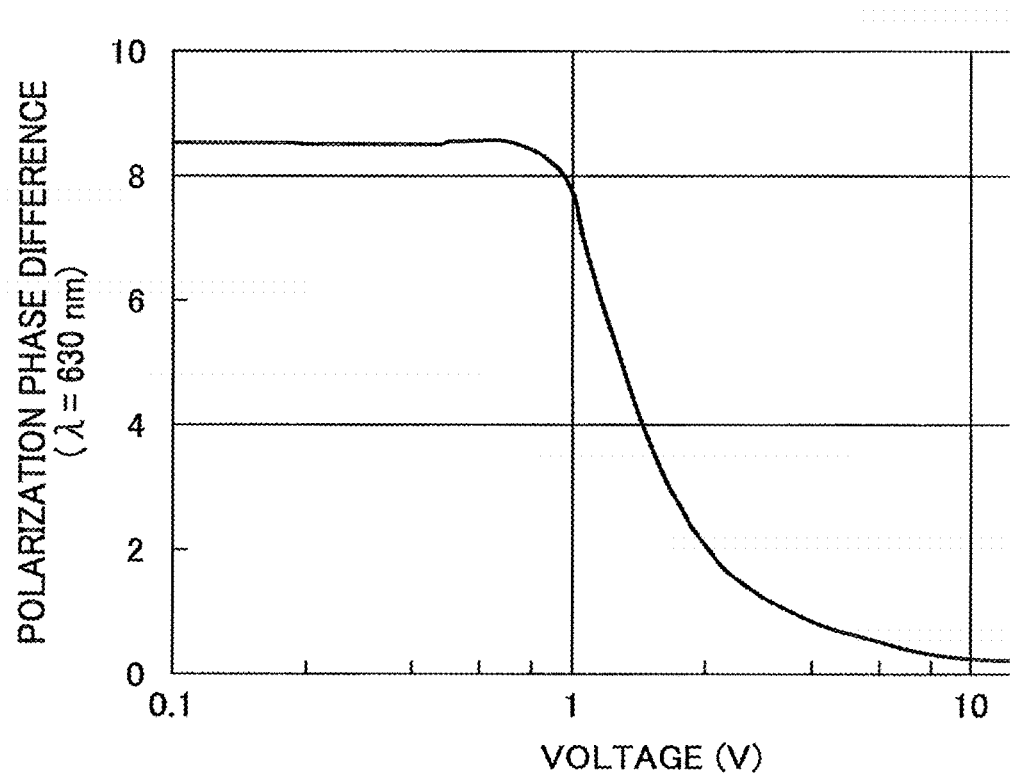
FIG. 3 is a diagram exemplifying a relationship between the voltage applied to a liquid crystal element and the polarization phase difference.

The voltage applied to a liquid crystal element is not proportional to the polarization phase difference. As an example, a relationship between the voltage applied to a liquid crystal element having the cell gap of 30 μm and the polarization phase difference is illustrated in FIG. 3. In FIG. 3, the vertical axis represents the polarization phase difference (by the units of wavelength where the wavelength is 630 nm), and the horizontal axis represents the voltage applied to the liquid crystal element (by a logarithmic scale).

Applying the voltage from 0 V to 10 V to the liquid crystal element can variably change the polarization phase difference by approximately up to 8λ (5000 nm). However, in general, a liquid crystal element is not stable in terms of alignment of the liquid crystal when a low voltage from 0 V to 1 V is applied, and the polarization phase difference varies by a temperature change and the like. In contrast, if the voltage applied to the liquid crystal element is greater than or equal to 5 V, the polarization phase difference changes less in response to a change of the voltage. In the case of this liquid crystal element, by using the applied voltage ranging from 1.5 V to 5 V, it is possible to stably and variably change the polarization phase difference by 4λ to 1λ, namely, around 3λ.

In the case where a liquid crystal element is used as the variable polarization phase difference member 30, the variable polarization phase difference member 30 is connected to a liquid crystal control circuit that controls the liquid crystal, to be controlled synchronously with the imaging element 60. In this case, it is necessary to variably change the polarization phase difference linearly in time, and to synchronize with a timing of imaging by the imaging element 60.

FIG. 3 is a diagram exemplifying a relationship between the voltage applied to a liquid crystal element and the polarization phase difference. As illustrated in FIG. 3, the voltage applied to the liquid crystal element does not cause a linear change in the polarization phase difference. Therefore, it is necessary to generate a signal that causes a linear change in the polarization phase difference within a certain period of time, and to apply the signal to the liquid crystal element as the drive voltage.

Figure 4:
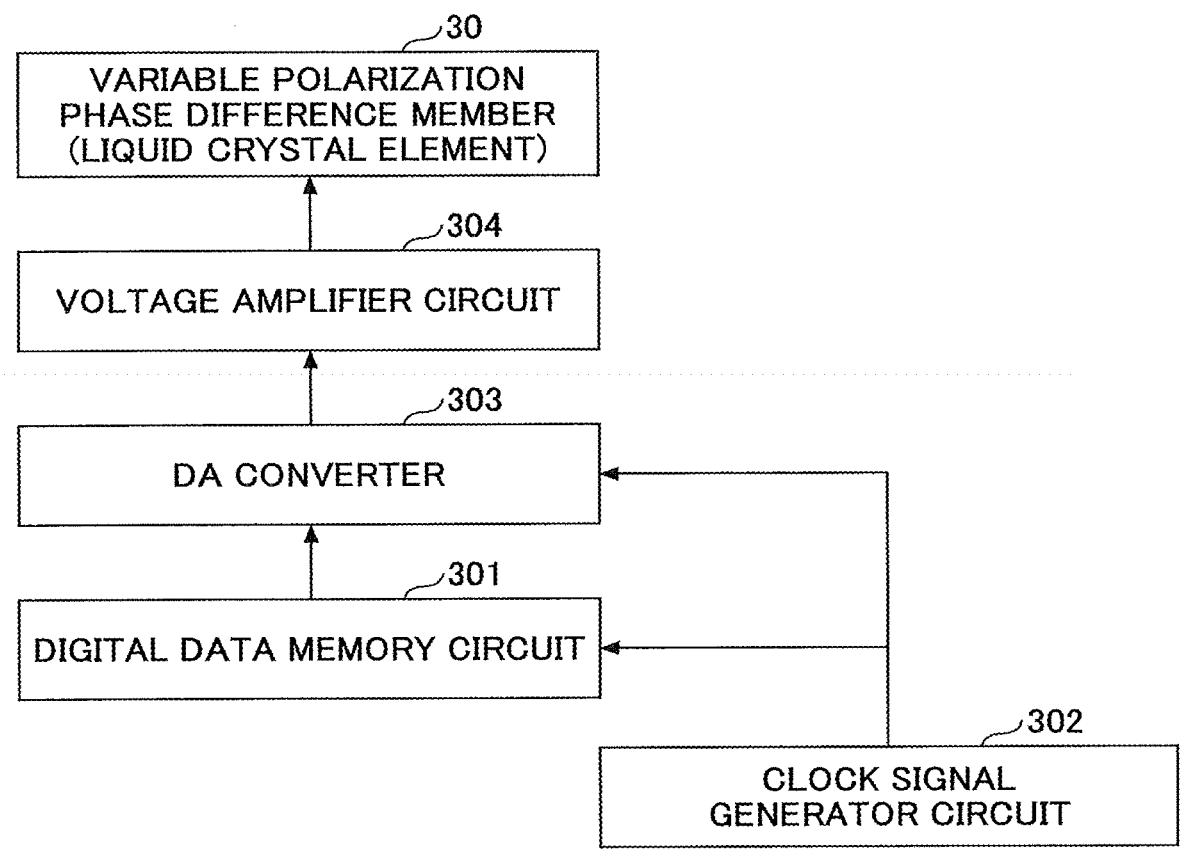
FIG. 4 is a diagram exemplifying a circuit that generates drive voltage with which the polarization phase difference of a liquid crystal element changes linearly in time.

FIG. 4 is a diagram exemplifying a circuit that generates the drive voltage with which the polarization phase difference of a liquid crystal element changes linearly in time.

In FIG. 4, a digital data memory circuit 301 records voltage values for changing the polarization phase difference by fixed intervals, and corresponding polarization phase differences in a necessary range of change of the polarization phase difference. The data is based on measurement performed in advance for voltages applied to the liquid crystal element to be used, and the corresponding polarization phase differences, and is recorded as digital data sorted by address. Table 1 exemplifies a part of digital data recorded on the digital data memory circuit 301. The column "VOLTAGE" in Table 1 lists digital data to be recorded, for each of which the polarization phase difference is changed by 10 nm.

TABLE 1

| POLARIZATION PHASE DIFFERENCE (nm) | VOLTAGE (V) |
|---|---|
| 1890 | 1.500 |
| 1880 | 1.510 |
| 1870 | 1.520 |
| 1860 | 1.529 |
| . | . |
| . | . |
| . | . |
| 630 | 4.999 |
| 620 | 5.000 |

A clock signal generator circuit 302 uses a crystal oscillator or the like to generate a clock signal that has a fixed frequency. The clock signal generated by the clock signal generator circuit 302 is input into the digital data memory circuit 301 and a DA converter 303.

The DA converter 303 is a circuit to convert digital data from the digital data memory circuit 301 into an analog signal. Following the clock signal generated by the clock signal generator circuit 302, digital data of the voltage values stored in the digital data memory circuit 301 is read out sequentially, and is sent to the DA converter 303.

The DA converter 303 converts digital data of the voltage values read out at fixed intervals of time into respective analog voltages. Each of the analog voltages output from the DA converter 303 is applied, via the voltage amplification circuit 304, to the liquid crystal element used as the variable polarization phase difference member 30.

Note that although not illustrated in FIG. 4, a drive circuit of this liquid crystal element synchronizes with a circuit that controls the imaging element 60 in FIG. 2, and once the application of the drive voltage to the liquid crystal element is started, the imaging element 60 starts imaging consecutively in time.

Figure 5:
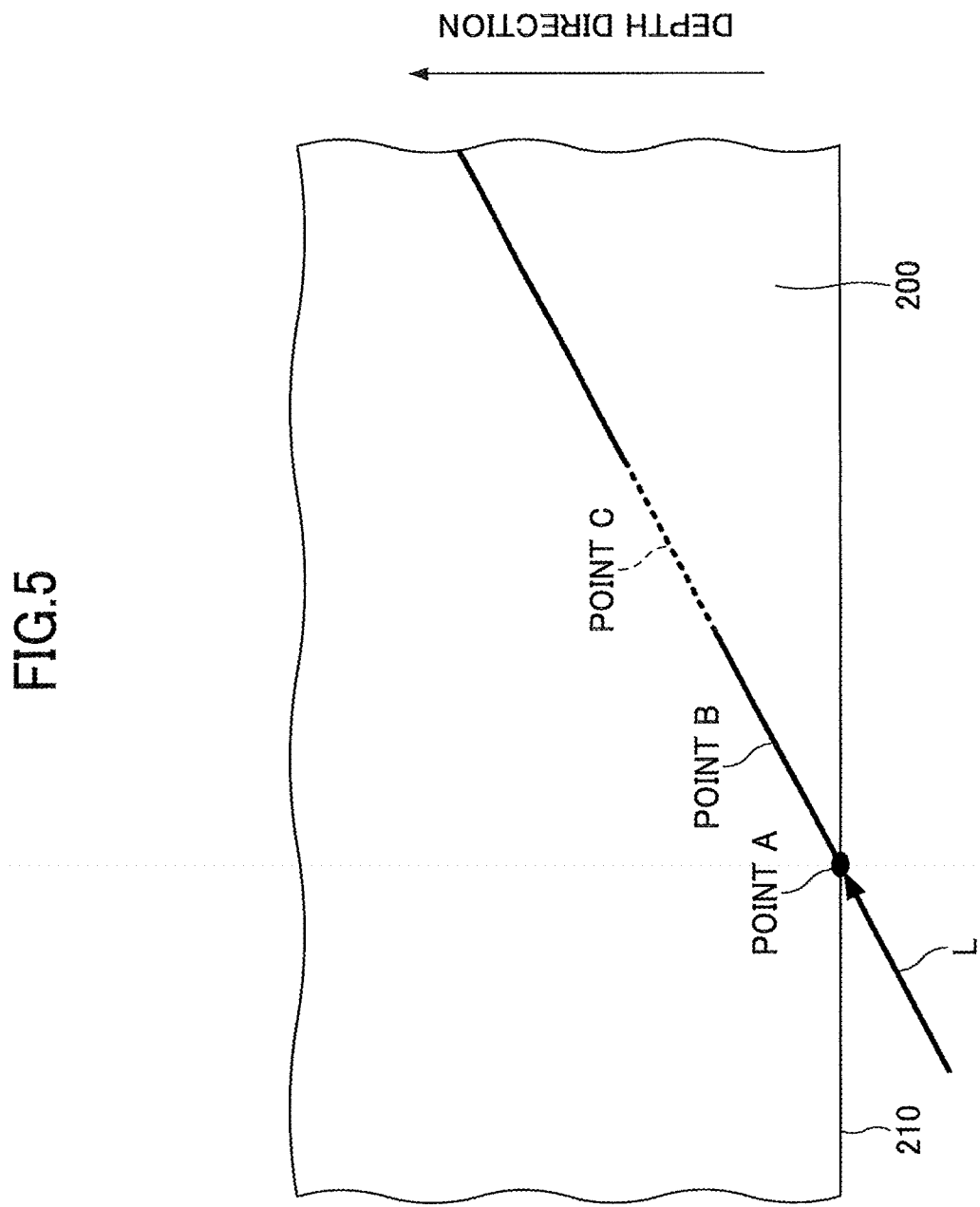
FIG. 5 is a diagram exemplifying a scattered light image of a laser light L at a certain moment when an image is formed on an imaging element.

FIG. 5 is a diagram exemplifying a scattered light image of the laser light L at a certain moment when an image is formed on the imaging element 60. In FIG. 5, the depth from the surface 210 of the chemically strengthened glass 200 becomes greater when going upward. In FIG. 5, a point A corresponds to the surface 210 of the chemically strengthened glass 200, and since the scattered light is intense on the surface 210 of the chemically strengthened glass 200, the scattered light image spreads in an elliptical shape.

Since a strong stress is imposed on the surface part of the chemically strengthened glass 200, double refraction caused by the photoelasticity effect changes the polarization phase difference of the laser light L along with the depth. Therefore, the scattered light brightness of the laser light L also changes along with the depth. Note that principles of changing scattered light brightness of a laser light caused by internal stress of a chemically strengthened glass is described, for example, in Yogyo-Kyokai-Shi (Journal of the Ceramic Association, Japan) 80{4}, 1972.

The variable polarization phase difference member 30 enables to change the polarization phase difference of the laser light L continuously in time before entering the chemically strengthened glass 200. This brings, at each point of the scattered light image in FIG. 5, a change in the scattered light brightness depending on the polarization phase difference changed by the variable polarization phase difference member 30.

Figure 6:
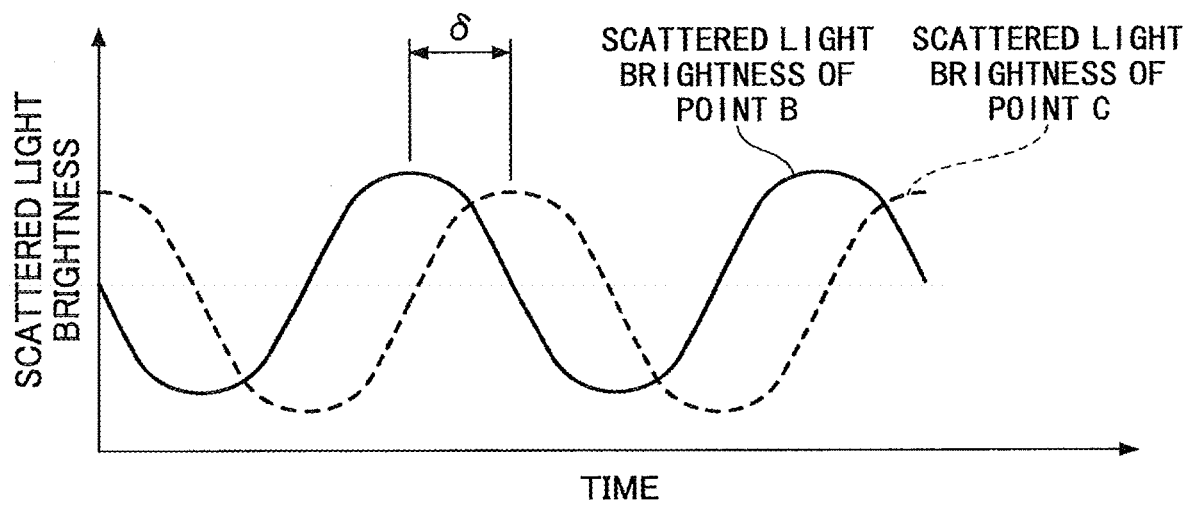
FIG. 6 is a diagram exemplifying change in time of scattered light brightness at a point B and a point C in FIG. 5.

FIG. 6 is a diagram exemplifying change in time of the scattered light brightness at a point B and a point C in FIG. 5. Depending on the polarization phase difference changed by the variable polarization phase difference member 30, the scattered light brightness changes periodically in time by the cycle of the wavelength λ of the laser light. For example, in FIG. 6, comparing the point B with the point C, the phases are different from each other although the cycle of the change of the scattered light brightness is the same. This is because when the laser light L travels from the point B to the point C, the polarization phase difference further changes by double refraction caused by the stress in the chemically strengthened glass 200. A phase difference δ between the point B and the point C is represented by δ=q/λ where q represents the polarization phase difference by a path difference when the laser light L travels from the point B to the point C, and λ represents the wavelength of the laser light.

Considering locally, when representing the phase F of periodic change of the scattered light brightness accompanying the change in time of the polarization phase difference by the variable polarization phase difference member 30 at a point S on the laser light L, by a function F(s) where s represents the position along the laser light L, dF/ds, or the derivative of F with respect to s, represents the quantity of double refraction that is generated in the chemically strengthened glass 200 owing to the stress within the surface. Using the photoelastic constant C of the chemically strengthened glass 200, dF/ds, and ds/dx being the derivative of s with respect to x representing the depth from the glass surface, the stress σ in the chemically strengthened glass 200 in a direction inward from the glass surface can be calculable by the following Expression (5).

$$\sigma(x) = \frac{1}{C} \frac{dF(s)}{ds} \frac{ds}{dx} \quad (5)$$

Meanwhile, the variable polarization phase difference member 30 changes the polarization phase difference by one wavelength or greater continuously in time within a certain period of time. During the period, the imaging element 60 captures multiple scattered light images of the laser light L consecutively in time, which are recorded. Then, change of the brightness in time is measured at the points of the scattered light images that have been consecutively captured.

The change of the brightness in time at the points of the scattered light images is periodic, and the period is fixed independently of the position. Therefore, the cycle T can be measured from change of the scattered light brightness at a certain point. Alternatively, an average of cycles at multiple points may be used as the cycle T.

Since the variable polarization phase difference member 30 changes the polarization phase difference by one wavelength or greater (one cycle or greater), the scattered light brightness also changes by one cycle or greater. Therefore, the cycle T can be measured from differences between multiple peaks or valleys, or time differences between the middle points of the amplitude. Note that it is theoretically impossible to know one cycle from data short of one cycle.

In the data of periodic change of the scattered light at a certain point, it is possible to precisely obtain the phase F at the point by the least-squares method or the Fourier integral of trigonometric functions based on the cycle T determined as above.

By using the least-squares method or the Fourier integral of trigonometric functions in the cycle T that is known in advance, it is possible to extract only the phase components having the known cycle T, and to remove noise of other cycles. Also, the removal capability becomes higher as data of change in time is available for a longer duration. Normally, the scattered light brightness is weak, and the quantity of phase that actually changes is small. Therefore, it is necessary to perform measurement by using data of variably changed polarization phase differences covering several λ.

Figure 7:
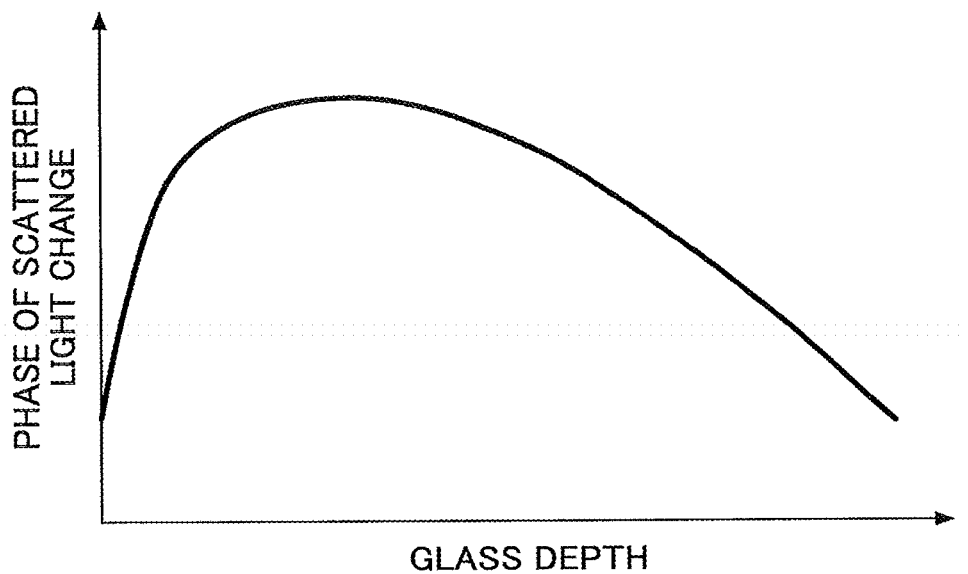
FIG. 7 is a diagram exemplifying the phase of scattered light change depending on the glass depth.

Once the data of the scattered light changing in time at the points along the laser light L in the scattered light images captured by the imaging element 60 has been measured, and the phase F has been obtained for each of the measured data by virtually the same method as described above, it is possible to obtain the phase F of the scattered light brightness along the laser light L. FIG. 7 is an example of the phase of scattered light change depending on the glass depth.

Figure 8:
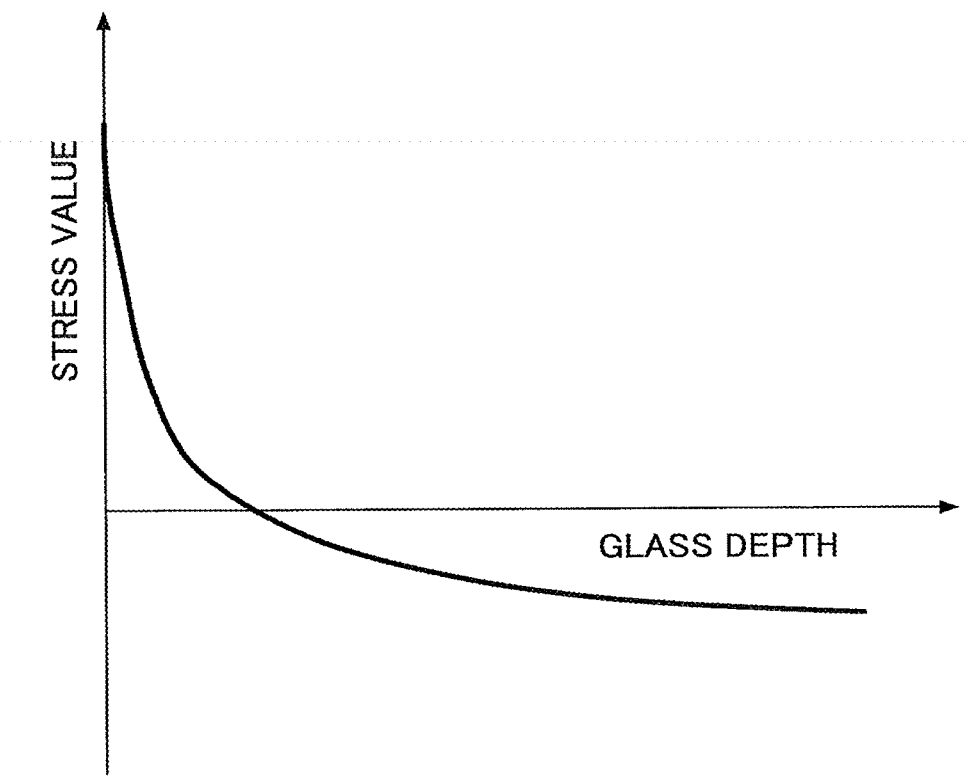
FIG. 8 is a diagram exemplifying a stress distribution obtained from Expression (5), based on phase data of the scattered light change in FIG. 7.

Based on this phase F of the scattered light brightness along the laser light L, by calculating a derivative value at coordinates on the laser light L, it is possible to obtain a stress value at the coordinates along the laser light L by Expression (5). Furthermore, by converting the coordinates s into the distance from the glass surface, it is possible to calculate a stress value with respect to the depth from the surface of the chemically strengthened glass. FIG. 8 is an example of a stress distribution obtained from Expression (5), based on the phase data of the scattered light change in FIG. 7.

Figure 9A:
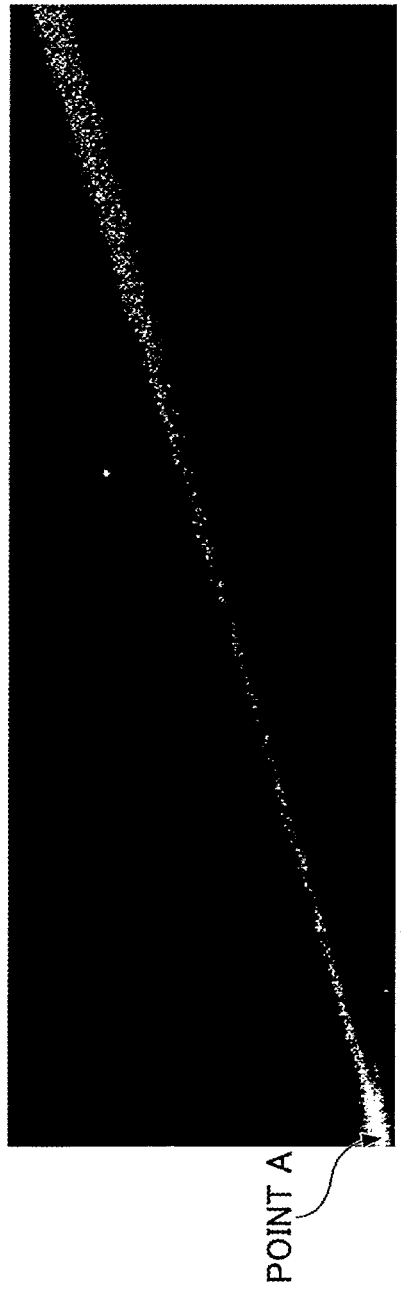
FIGS. 9A-9B are diagrams exemplifying actual scattered light images at different times t1 and t2.
Figure 9B:
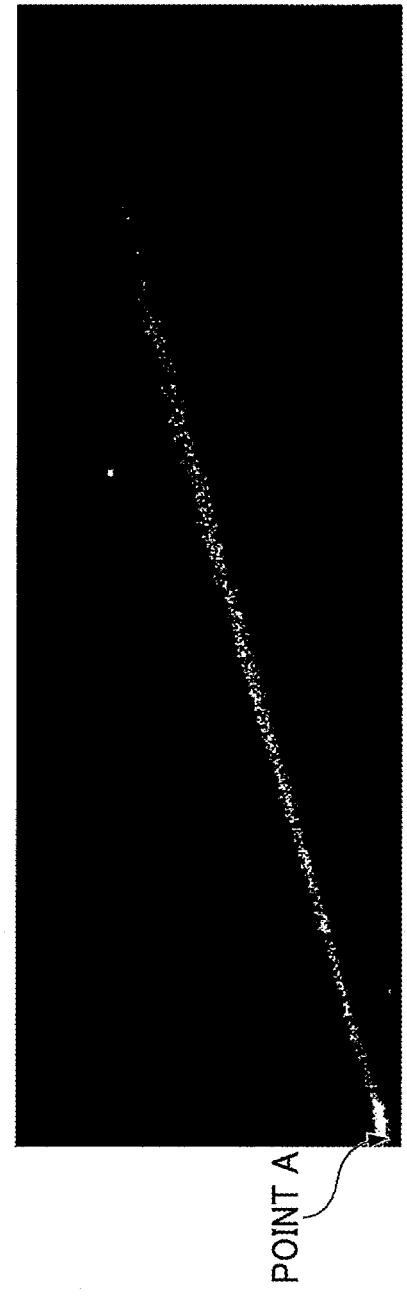

FIGS. 9A-9B are examples of actual scattered light images at different times t1 and t2 in which a point A is located on the surface of the chemically strengthened glass, at which a surface scattered light is captured that is caused by roughness on the surface of the chemically strengthened glass. The center of this surface scattered light image corresponds to the surface of the chemically strengthened glass.

From FIGS. 9A-9B, it can be understood that the brightness in a scattered light image of the laser light differs on different points, and even for the same point, the brightness distribution at the time t2 is not the same as the brightness distribution at the time t1. This is because the phase of the periodic scattered light brightness is shifted.

In the stress measurement device 1, it is favorable that the plane of incidence of the laser light L is tilted by 45° with respect to the surface 210 of the chemically strengthened glass 200. This will be described referring to FIGS. 10A-10B and FIGS. 11A-11B.

Figure 10A:
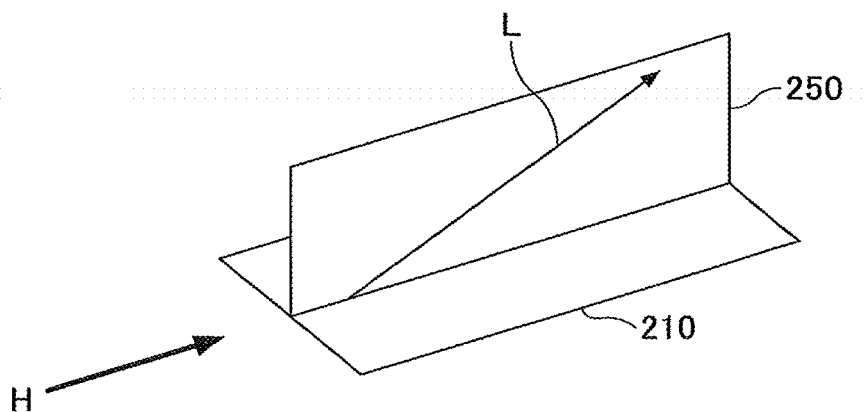
FIGS. 10A-10B are diagrams illustrating an unfavorable example of a design of a plane of incidence of a laser light L in a chemically strengthened glass.
Figure 10B:
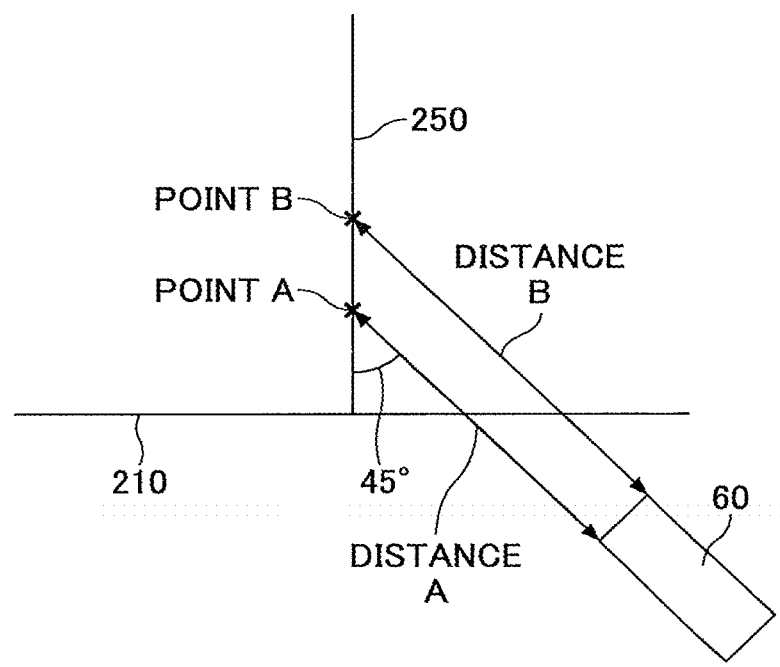

FIGS. 10A-10B are diagrams illustrating an unfavorable example of a design of a plane of incidence of the laser light L in a chemically strengthened glass. In FIG. 10A, a plane of incidence 250 of the laser light L in the chemically strengthened glass 200 is perpendicular to the surface 210 of the chemically strengthened glass.

FIG. 10B illustrates the same design viewed in a direction H in FIG. 10A. As illustrated in FIG. 10B, the imaging element 60 is installed to be tilted 45° with respect to the surface 210 of the chemically strengthened glass 200, to observe the laser light L at a slant of 45°. In the case of FIG. 10B, a distance A is different from a distance B where the points A and B are different points on the laser light L, the distance A represents the distance from a point A to the imaging element 60, and the distance B represents the distance from another point B to the imaging element 60. In other words, the point A and the point B cannot be in focus simultaneously, and a scattered light image of the laser light L cannot be obtained in a necessary region as a favorable image.

Figure 11A:
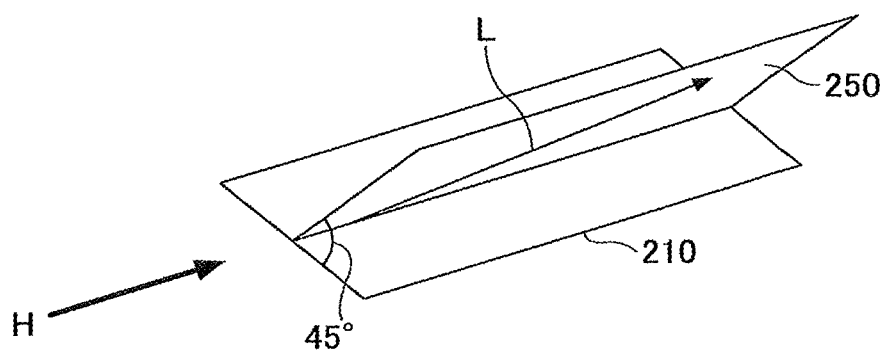
FIGS. 11A-11B are diagrams illustrating a favorable example of a design of a plane of incidence of a laser light L in a chemically strengthened glass.
Figure 11B:
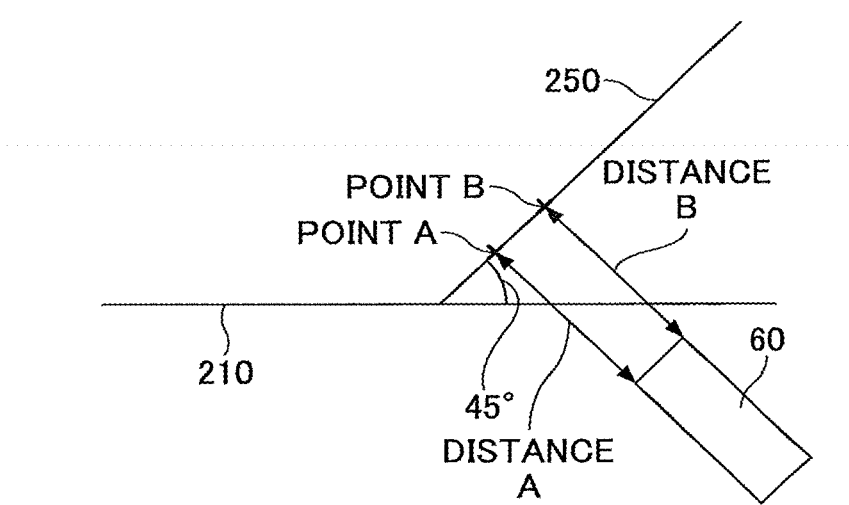

FIGS. 11A-11B are diagrams illustrating a favorable example of a design of a plane of incidence of the laser light L in the chemically strengthened glass. In FIG. 11A, a plane of incidence 250 of the laser light L in the chemically strengthened glass 200 is tilted by 45° with respect to the surface 210 of the chemically strengthened glass.

FIG. 11B illustrates the same design viewed in a direction H in FIG. 11A. As illustrated in FIG. 11B, the imaging element 60 is installed to be tilted 45° with respect to the surface 210 of the chemically strengthened glass 200, and the plane of incidence 250 through which the laser light L travels is also tilted by 45°. Therefore, at any point on the laser light L, the distance (distance A or distance B) to the imaging element 60 is the same, and a scattered light image of the laser light L can be obtained in a necessary region as a favorable image.

Especially, in the case of using a laser light having the minimum beam diameter of 20 μm or less, the depth of focus is shallow, which would be around 10 μm at the deepest. Therefore, it is extremely important for obtaining a favorable image to have the same distance from any point on the laser light L to the imaging element 60, by tilting the plane of incidence 250 of the laser light L in the chemically strengthened glass 200 by 45° with respect to the surface 210 of the chemically strengthened glass 200.

(Flow of Measurement)

Figure 12:
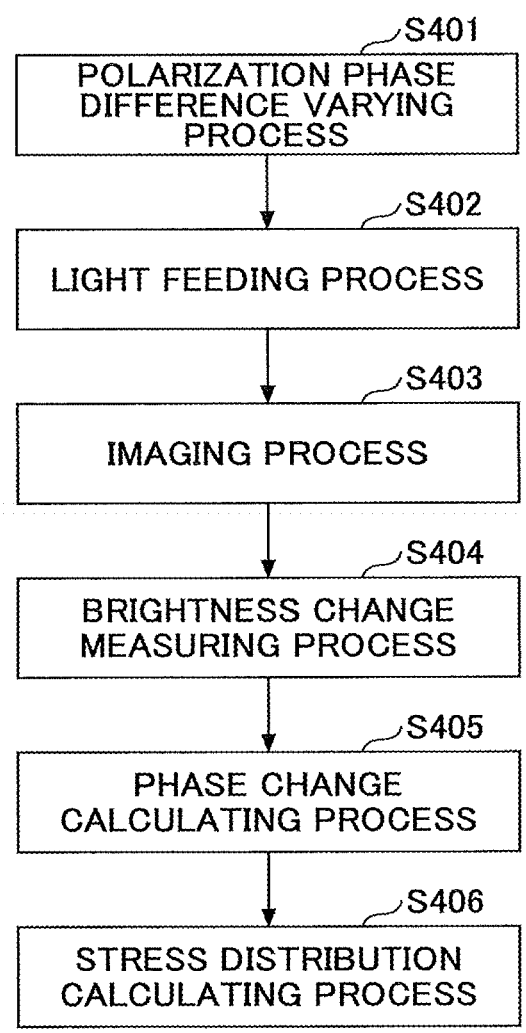
FIG. 12 is a flowchart exemplifying a measuring method executed by a stress measurement device 1.
Figure 13:
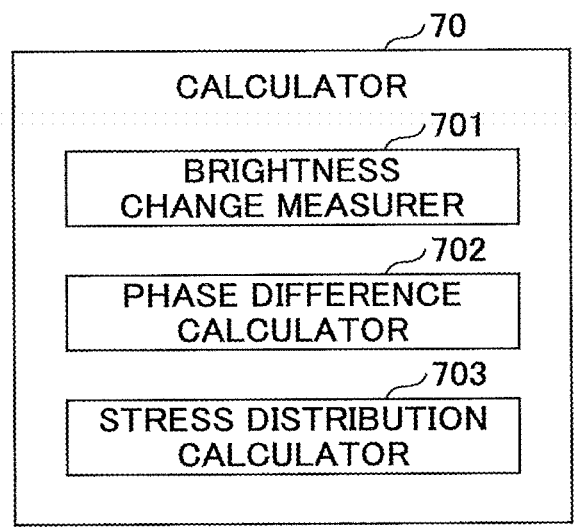
FIG. 13 is a diagram exemplifying functional blocks of an arithmetic unit 70 of a stress measurement device 1.

Next, a process flow of measurement will be described referring to FIG. 12 and FIG. 13. FIG. 12 is a flowchart exemplifying a measuring method executed by the stress measurement device 1. FIG. 13 is a diagram exemplifying functional blocks of the arithmetic unit 70 of the stress measurement device 1.

First, at Step S401, the variable polarization phase difference member 30 variably changes the polarization phase difference of the laser light from the laser light source 10 in which the light is polarized from the beginning or from the laser light source 10 in which the light is forcibly polarized, by one wavelength or greater with respect to the wavelength of the laser light continuously in time (polarization phase difference varying process).

Next, at Step S402, the laser light whose polarization phase difference has been variably changed is entered aslant into the chemically strengthened glass 200 as an object to be measured, via the light feeding member 40, through the surface 210 (light feeding process).

Next, at Step S403, the imaging element 60 captures multiple times scattered light of the laser light that has the variably changed polarization phase difference and travels through the chemically strengthened glass 200, at predetermined time intervals to obtain multiple images (imaging process).

Next, at Step S404, a brightness change measurer 701 of the arithmetic unit 70 uses the multiple images of the scattered light captured in the imaging process at the time intervals, to measure periodic brightness change of the scattered light accompanying the change in time of the polarization phase difference that has been variably changed in the polarization phase difference varying process (brightness change measuring process).

Next, at Step S405, a phase change calculator 702 of the arithmetic unit 70 calculates the phase change of the periodic brightness change of the scattered light along the laser light that entered the chemically strengthened glass 200 (phase change calculating process).

Next, at Step S406, a stress distribution calculator 703 of the arithmetic unit 70 calculates, based on the phase change of the periodic brightness change of the scattered light along the laser light that entered the chemically strengthened glass 200, a stress distribution in the depth direction from the surface 210 of the chemically strengthened glass 200 (stress distribution calculating process). Note that the calculated stress distribution may be presented on a display device (a liquid crystal display or the like).

In this way, unlike a stress measurement device using a surface guided wave, the stress measurement device 1 does not perform stress measurement that depends on a distribution of the refractive index of a chemically strengthened glass, but performs measurement based on the scattered light. Therefore, irrespective of the distribution of the refractive index of the chemically strengthened glass (or unrelated to the distribution of the refractive index of the chemically strengthened glass), it is possible to measure a stress distribution of a chemically strengthened glass from the topmost surface of the chemically strengthened glass down to a deeper part than conventionally achieved. For example, stress measurement can also be applied to a chemically strengthened glass of a lithium-containing aluminosilicate glass in which the refractive index becomes higher along with the depth beyond a certain depth.

The variable polarization phase difference member 30 variably changes continuously in time the polarization phase difference of the laser light by one wavelength or greater with respect to the wavelength of the laser light. Therefore, it becomes possible to obtain the phase of the periodic brightness change of the scattered light by the least-squares method or the Fourier integral of trigonometric functions. Unlike the conventional method of detecting the phase based on positional change of peaks or valleys of a wave, the method using the least-squares method or the Fourier integral of trigonometric functions takes the entire data of waves into account, and is based on cycles known in advance, and hence, noise of other cycles can be removed. Consequently, it becomes possible to obtain the phase of the periodic brightness change of the scattered light easily and precisely.

<Measuring Method of Stress Profile (2)>

In this section of Measuring method of stress profile (2), a second example of a device and a method for measuring a stress profile of a chemically strengthened glass according to the above embodiment will be described. Note that in Measuring method of stress profile (2), description may be omitted for the same elements as in Measuring method of stress profile (1) that has already been described.

Figure 14A:
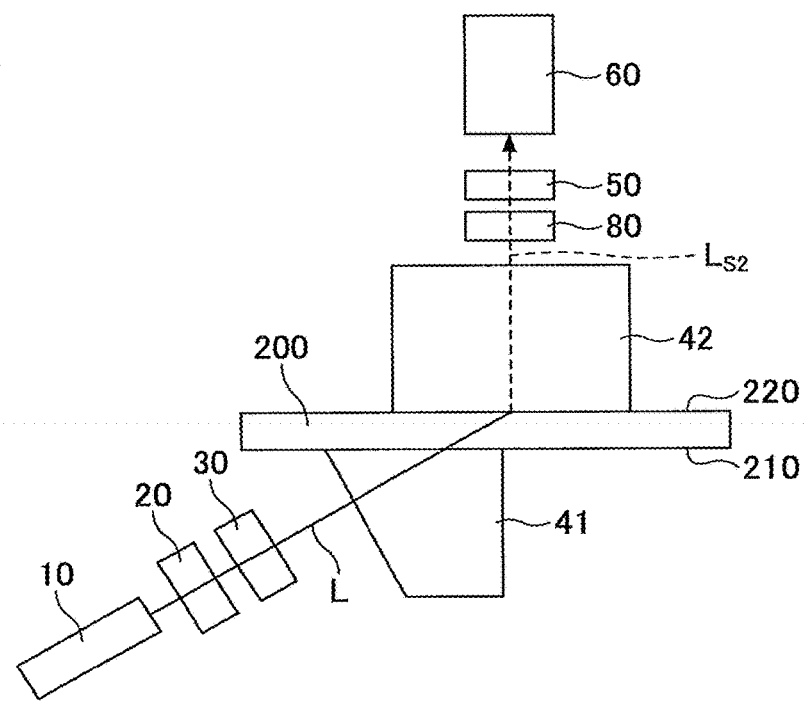
FIGS. 14A-14B are diagrams illustrating a second example of a stress profile measuring device.
Figure 14B:
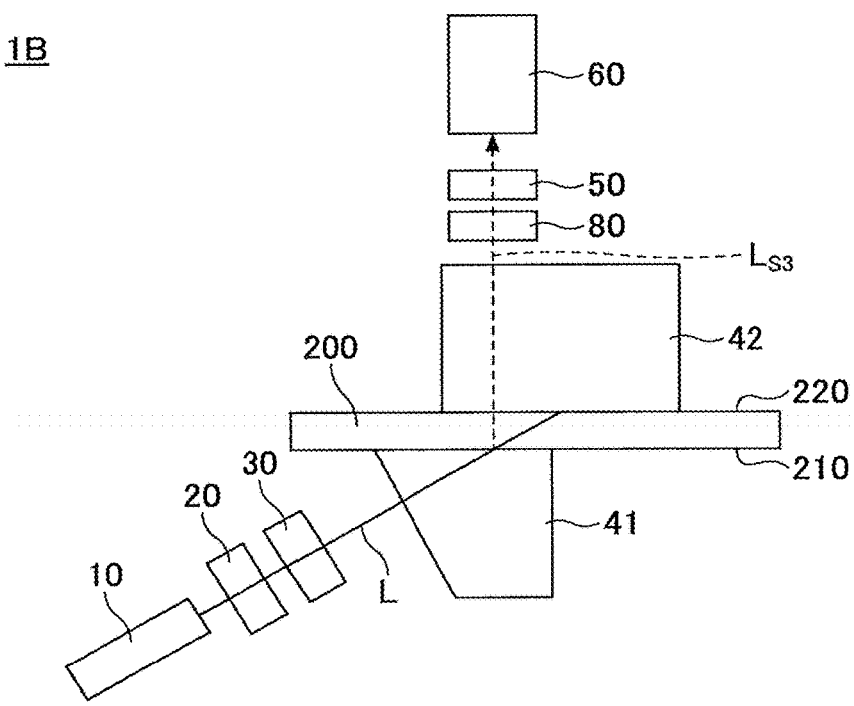

FIGS. 14A-14B are diagrams illustrating a second example of a stress profile measuring device. As illustrated in FIG. 14A, the stress measurement device 1A differs from the stress measurement device 1 (see FIG. 1), in which a light wavelength selection member 80, a light conversion member 50, and an imaging element 60 are placed on the opposite side of a light feeding member 41 with respect to the chemically strengthened glass 200, and further, a light extraction member 42 is placed to contact a back surface 220 of the chemically strengthened glass 200. Note that illustration of an arithmetic unit is omitted in FIGS. 14A-14B.

The stress measurement device 1A causes scattered light LS2 generated on the back surface 220 side of the chemically strengthened glass 200 to enter the imaging element 60 through the light extraction member 42 being a prism or the like, the light wavelength selection member 80, and the light conversion member 50 so that the imaging element 60 captures multiple images at time intervals within a certain period of time. The components and operations other than these are virtually the same as in the stress measurement device 1.

Note that although providing the light feeding member 41 enables to reduce reflection of the laser light L on the surface 210 of the chemically strengthened glass 200, if the reflection of the laser light L on the surface 210 of the chemically strengthened glass 200 does not matter, the laser light L may be directly incident on the chemically strengthened glass 200 without providing the light feeding member 41.

Since the chemically strengthened glass 200 generally has the same stress distribution on both sides of the front and back surfaces, scattered light Ls may be detected on the side of the surface 210 of the chemically strengthened glass 200 (incoming side of the laser light L) as in the stress measurement device 1, or scattered light LS2 may be detected on the side of the back surface 220 of the chemically strengthened glass 200 (outgoing side of the laser light L) as in the stress measurement device 1A.

Note that in the case of detecting the scattered light LS2 on the side of the back surface 220 of the chemically strengthened glass 200, it is favorable for the laser light in the chemically strengthened glass 200 to satisfy a condition of total reflection. This is because total reflection of the laser light on the back surface 220 of the chemically strengthened glass 200 can reduce diffused reflection on the back surface 220 of the chemically strengthened glass 200, and can prevent unnecessary light from entering the imaging element 60. By adjusting the angle of incidence of the laser light on the chemically strengthened glass 200, it is possible for the laser light to satisfy the condition of total reflection on the back surface 220 of the chemically strengthened glass 200.

Alternatively, as in a stress measurement device 1B illustrated in FIG. 14B, scattered light LS3 generated on the surface 210 side of the chemically strengthened glass 200 and emitted from the back surface 220 side, may be entered into the imaging element 60 via a light extraction member 42 being a prism or the like, a light wavelength selection member 80, and a light conversion member 50 so that the imaging element 60 captures multiple images at time intervals within a certain period of time. The components and operations other than these are virtually the same as in the stress measurement device 1.

Note that as in the stress measurement device 1A, although providing the light feeding member 41 enables to reduce reflection of the laser light L on the surface 210 of the chemically strengthened glass 200, if the reflection of the laser light L on the surface 210 of the chemically strengthened glass 200 does not matter, the laser light L may be directly incident on the chemically strengthened glass 200 without providing the light feeding member 41.

In either case of the stress measurement device 1A or 1B, as in the stress measurement device 1, from the phase change of the periodic brightness change of the scattered light along the laser light that entered the chemically strengthened glass 200, a stress distribution can be calculated in the depth direction from the back surface 220 of the chemically strengthened glass 200.

Especially, according to the stress measurement device 1B, since the focus of laser is set to the same position from the front surface of the glass without depending on the glass sheet thickness, even when measuring a chemically strengthened glass that has a similar stress distribution, effects are brought such that adjusting the focal position of the laser is not required, or is required but simply done with fine tuning, and thereby, measuring time becomes shorter, and the reproducibility is further improved.

<Measuring Method of Stress Profile (3)>

In this section of Measuring method of stress profile (3), a third example of a device and a method for measuring a stress profile of a chemically strengthened glass according to the above embodiment will be described. Note that in Measuring method of stress profile (3), description may be omitted for the same elements as in Measuring methods of stress profile (1) and (2) that have already been described.

Figure 15:
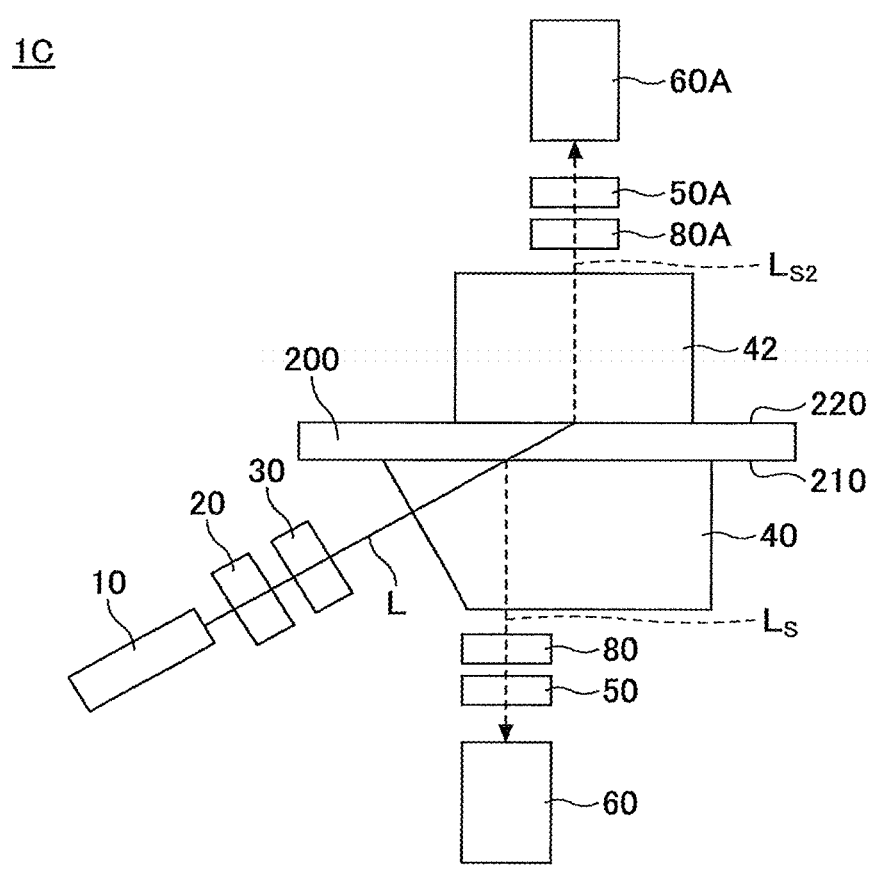
FIG. 15 is a diagram illustrating a third example of a stress profile measuring device.

FIG. 15 is a diagram illustrating a third example of a stress profile measuring device. As illustrated in FIG. 15, a stress measurement device 1C differs from the stress measurement device 1 (see FIG. 1), in that a light wavelength selection member 80A, a light conversion member 50A, and an imaging element 60A are placed on the opposite side of a light feeding member 40 with respect to the chemically strengthened glass 200, and further, a light extraction member 42 is placed to contact a back surface 220 of the chemically strengthened glass 200. Note that illustration of an arithmetic unit is omitted in FIG. 15.

As in the stress measurement device 1, it is possible for the stress measurement device 1C to detect scattered light LS emitted from the surface 210 side of the chemically strengthened glass 200. Further, the stress measurement device 1C causes the scattered light LS2 generated on the back surface 220 side of the chemically strengthened glass 200 to enter the imaging element 60A through the light extraction member 42 being a prism or the like, the light wavelength selection member 80A, and the light conversion member 50A so that the imaging element 60A captures multiple images at time intervals within a certain period of time. The operations other than these are virtually the same as in the stress measurement device 1.

Configured as in FIG. 15, it is possible for the stress measurement device 1C to simultaneously calculate a stress distribution in the depth direction from the surface 210 of the chemically strengthened glass 200, and a stress distribution in the depth direction from the back surface 220 of the chemically strengthened glass 200. This is effective in the case of measuring a chemically strengthened glass in which the stress distribution is not the same on both sides of the front and back surfaces, and in the case where one may want to confirm whether the stress distribution is the same on both sides of the front and back surfaces for any chemically strengthened glass.

<Measuring Method of Stress Profile (4)>

In this section of Measuring method of stress profile (4), a fourth example of a device and a method for measuring a stress profile of a chemically strengthened glass according to the above embodiment will be described. Note that in Measuring method of stress profile (4), description may be omitted for the same elements as in Measuring methods of stress profile (1) to (3) that have already been described.

Figure 16:
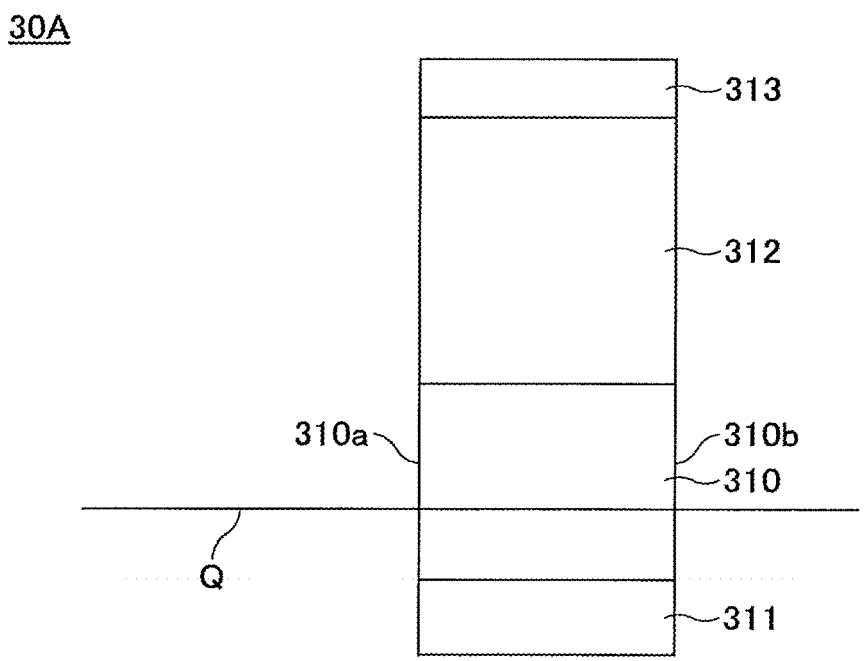
FIG. 16 is an explanatory diagram of a variable polarization phase difference member using the photoelasticity effect.

As a variable polarization phase difference member, a transparent material may be adopted to make use of its photoelasticity effect with which the polarization phase difference can be variably changed by pressurization. FIG. 16 is an explanatory diagram of a variable polarization phase difference member using the photoelasticity effect.

In a variable polarization phase difference member 30A illustrated in FIG. 16, one surface of a polarization phase difference generating material 310 formed to be an approximately rectangular parallelepiped is fixed by a fixed jig 311, and the opposite surface of the polarization phase difference generating material 310 contacts one surface of a piezoelectric element 312, and the opposite surface of the piezoelectric element 312 is fixed by a fixed jig 313.

A mirroring process has been applied to the surface of the polarization phase difference generating material 310 contacting the piezoelectric element 312, and to two surfaces 310a and 310b facing each other and extending in the direction perpendicular to the surface, so as to enable a ray of polarized light Q to transmit. As the polarization phase difference generating material 310, a transparent material having a great photoelasticity effect can be used, including, for example, silica glass as a glass, and polycarbonate as a resin.

When a voltage is applied, the piezoelectric element 312 extends or contracts in the voltage applied direction. Whether to extend or to contract is determined by whether the voltage is positive or negative. Although not illustrated in FIG. 16, a piezoelectric element driving voltage generator circuit that controls the voltage applied to the piezoelectric element 312 is connected to the piezoelectric element 312.

When a voltage to extend the piezoelectric element 312 is applied by the piezoelectric element driving voltage generator circuit, the piezoelectric element 312 is deformed to extend in the voltage applied direction. However, the piezoelectric element 312 is placed such that the polarization phase difference generating material 310 is located in the extending direction.

When a voltage to extend the piezoelectric element 312 is applied by the piezoelectric element driving voltage generator circuit, the piezoelectric element 312 is deformed to extend in the direction along which the polarization phase difference generating material 310 is located. As being fixed by the fixed jigs 311 and 313, the polarization phase difference generating material 310 contracts, and a compressive stress is imposed. By the compressive stress imposed on the polarization phase difference generating material 310, double refraction is generated in the direction in which the ray of light Q transmits, and a polarization phase difference is generated in the ray of light Q. Since the quantity of the polarization phase difference is proportional to the voltage applied to the piezoelectric element 312, it is possible to control the polarization phase difference by the piezoelectric element driving voltage generator circuit that applies the drive voltage to the piezoelectric element 312.

For example, as the polarization phase difference generating material 310, a 10-mm cube of polycarbonate may be used. Polycarbonate has the photoelastic constant of approximately 700 nm/cm/MPa, and Young's modulus of approximately 2.5 GPa.

As the piezoelectric element 312, it is possible to use, for example, a stacked piezoelectric element in which an electrode and a high dielectric ceramic that has a perovskite crystal structure such as lead zirconate titanate having a great piezo effect, are stacked alternatingly. By forming such a stacked piezoelectric element, for example, with 100 stacked layers each of which has the thickness of 200 μm so as to have the total length of approximately 20 mm, the obtained piezoelectric element is capable of extending by 10 μm or longer with an applied voltage of 100 V.

Since the Young's modulus of lead zirconate titanate as the material of the piezoelectric element 312 is 10 times greater or more compared with polycarbonate, the extension of the piezoelectric element 312 almost entirely turns into compression of polycarbonate; if the piezoelectric elements 312 extends by 10 μm, the 10-mm cubic polycarbonate is compressed by 0.1%, and the compressive stress in this case is 2.5 MPa. If the ray of light Q transmits through the 10-mm polarization phase difference generating material 310, a polarization phase difference of 1750 nm is generated, and if the wavelength is 630 nm, the polarization phase difference can be variably changed by 2.8λ.

For example, as the polarization phase difference generating material 310, a 10-mm cube of silica glass may be used. Silica glass has the photoelastic constant of approximately 35 nm/cm/MPa, and Young's modulus of approximately 70 GPa. Since the Young's modulus of lead zirconate titanate as the material of the piezoelectric element 312 is nearly the same as that of silica glass, approximately a half of the extension of the piezoelectric element 312 turns into compression of silica glass; if the piezoelectric elements 312 extends by 10 μm, the 10-mm cubic of silica glass is compressed by approximately 0.05%, and the compressive stress in this case is approximately 35 MPa. If the ray of light Q transmits through the 10-mm polarization phase difference generating material 310, a polarization phase difference of 1225 nm is generated, and if the wavelength is 630 nm, the polarization phase difference can be variably changed by 1.9λ.

In this way, in the case of generating the polarization phase difference by deforming a material, a value obtained by multiplying the photoelastic constant by Young's modulus is important, which is 0.18 (dimensionless) in the case of polycarbonate, and is 0.26 (dimensionless) in the case of silica. In other words, it is important to use a transparent member that has this value greater than or equal to 0.1 as the polarization phase difference generating material 310.

In this way, the variable polarization phase difference member is not limited to a liquid crystal element, and the variable polarization phase difference member can be formed by using a piezoelectric element or by any other way as long as the polarization phase difference when entering the chemically strengthened glass 200 can be changed in time, and the polarization phase difference can be changed by the wavelength λ of the laser light multiplied by unity or greater.

<Measuring Method of Stress Profile (5)>

In this section of Measuring method of stress profile (5), a fifth example of a device and a method for measuring a stress profile of a chemically strengthened glass according to the above embodiment will be described. Note that in Measuring method of stress profile (5), description may be omitted for the same elements as in Measuring methods of stress profile (1) to (4) that have already been described.

Figure 18:
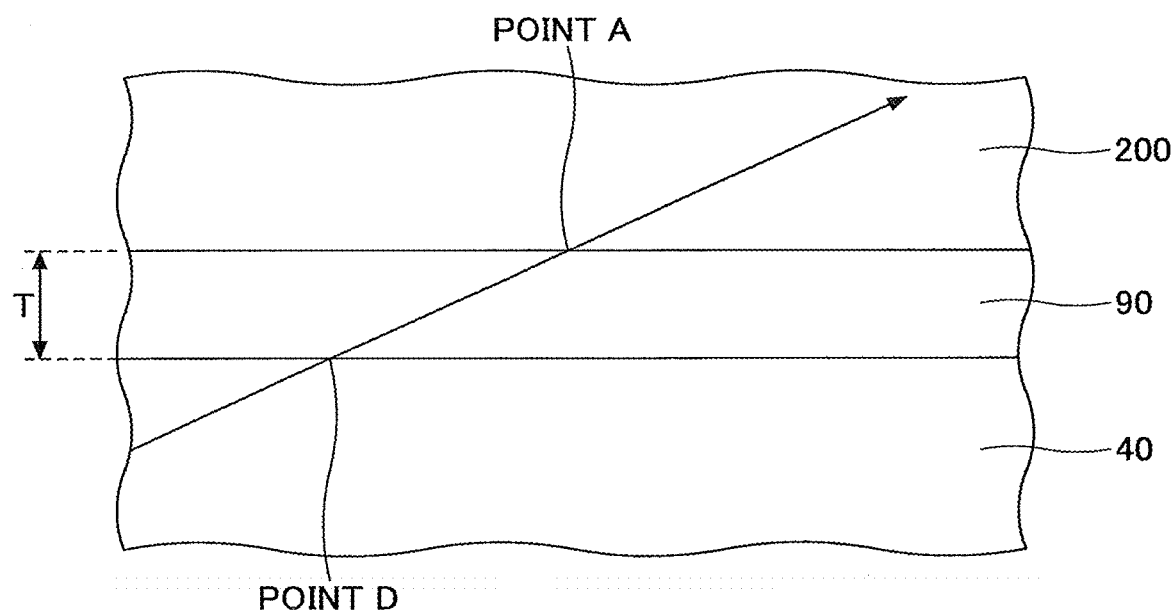
FIG. 18 is a diagram illustrating a fifth example of a stress profile measuring device.

FIG. 18 is a diagram illustrating a fifth example of a stress profile measuring device, and illustrates a cross section near the interface of the light feeding member and the chemically strengthened glass.

As illustrated in FIG. 18, in the fifth example, a liquid 90 having nearly the same refractive index as the chemically strengthened glass 200 is sandwiched between the light feeding member 40 and the chemically strengthened glass 200. This is based on the following reason. Since the refractive index of the chemically strengthened glass 200 varies a little depending on the type of the chemically strengthened glass, in order to make the refractive index of the chemically strengthened glass 200 completely coincident with the refractive index of the light feeding member 40, it is necessary to exchange the light feeding member 40 for each type of the chemically strengthened glass. However, this exchange work is inefficient. Thereupon, the liquid 90 having nearly the same refractive index as the chemically strengthened glass 200 is sandwiched between the light feeding member 40 and the chemically strengthened glass 200, to enable the laser light L efficiently to enter the chemically strengthened glass 200.

As the liquid 90, it is possible to use, for example, a mixed solution of 1-bromonaphthalene (n=1.64) and xylene (n=1.50). Since the refractive index of the liquid 90 is determined by the mixture ratio of the ingredients, the same refractive index as the refractive index of the chemically strengthened glass 200 can be easily obtained.

At this time, it is favorable to make the difference of the refractive indices between the chemically strengthened glass 200 and the liquid 90 less than or equal to |±0.03|, more favorable to make it less than or equal to |±0.02|, and furthermore favorable to make it less than or equal to |±0.01|. In the case of not having the liquid 90, a scattered light is generated between the chemically strengthened glass 200 and the light feeding member, and data cannot be taken in the range of approximately 20 μm.

It is favorable to make the thickness of the liquid 90 greater than or equal to 10 μm because the value of 10 μm or greater curbs the scattered light approximately 10 μm wide or less. Although the liquid 90 could have any significant thickness in principle, considering handling of the liquid, it is favorable to be less than or equal to 500 μm.

Figure 19:
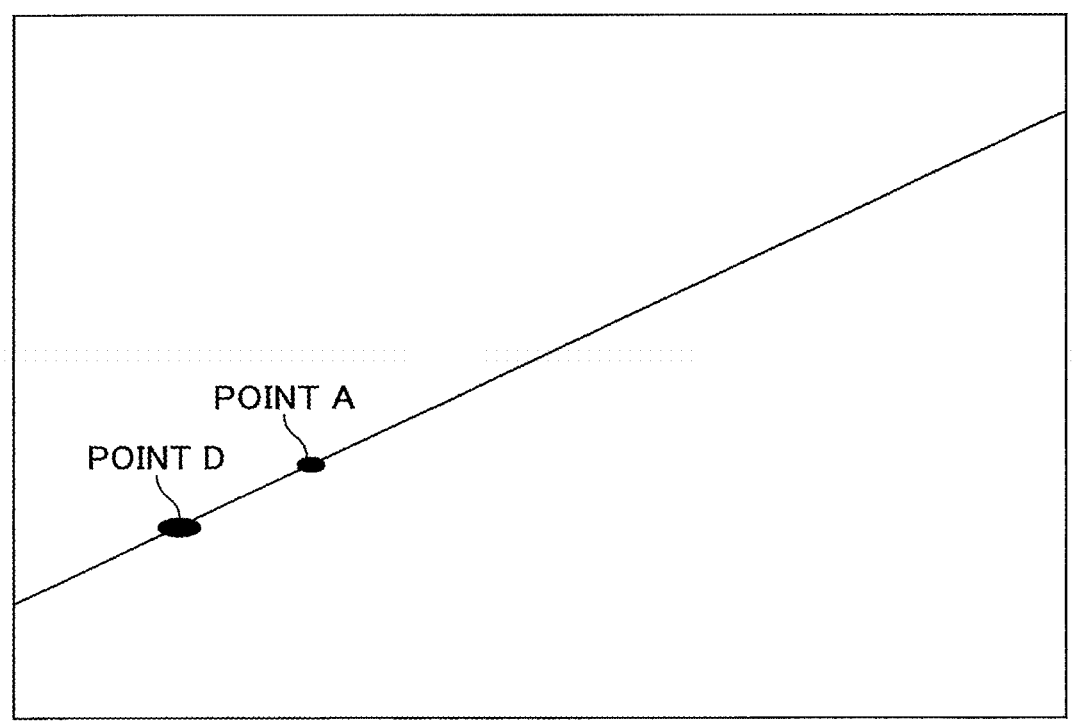
FIG. 19 is a diagram exemplifying a scattered light image of a laser light L that travels through an interface of a light feeding member and a chemically strengthened glass.

FIG. 19 is a diagram exemplifying a scattered light image of the laser light L that travels through the interface of the light feeding member 40 and the chemically strengthened glass 200. In FIG. 19, a point A represents the scattered light on the surface of the chemically strengthened glass 200, and a point D represents a surface scattered light on the surface of the light feeding member 40. A segment between the point A and the point D represents the scattered light through the liquid 90.

If the thickness of the liquid 90 is thin, the point A and the point D turn out to be nearly the same point, and a surface scattered light is formed in which surface scattering of the chemically strengthened glass 200 is added with surface scattering of the light feeding member 40. After having been used many times for measuring chemically strengthened glasses 200, the light feeding members 40 may have a number of chips on the surface. In such a case, an extremely significant surface scattered light is generated.

However, as in FIG. 19, by inserting the liquid 90 to maintain an interval between the light feeding member 40 and the chemically strengthened glass 200, it is possible to prevent the surface scattered light of the light feeding member 40 from interfering with measurement of the chemically strengthened glass 200 near the topmost surface layer.

Figure 20A:
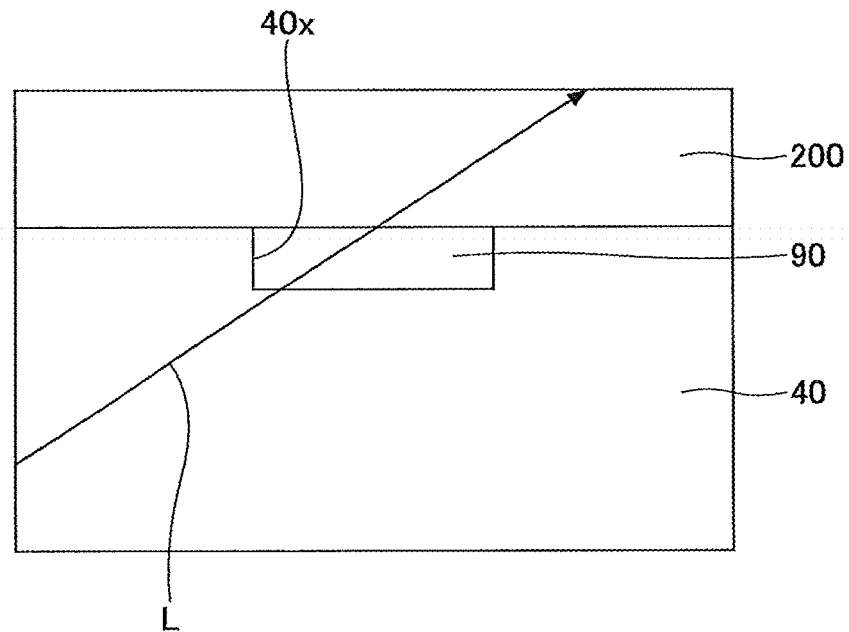
FIGS. 20A-20B are diagrams exemplifying structural parts for having a liquid sandwiched between a light feeding member and a chemically strengthened glass.
Figure 20B:
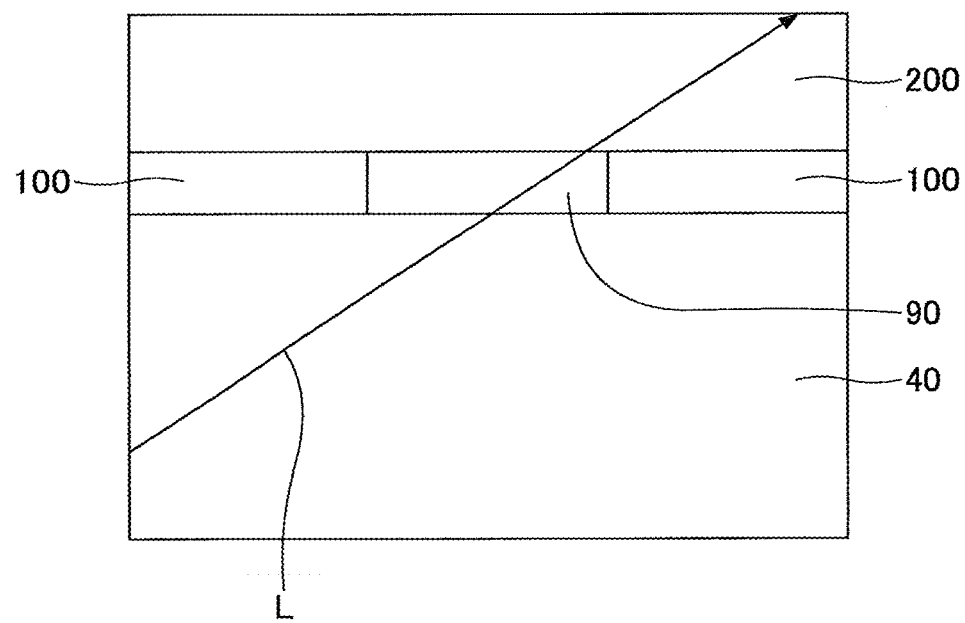

FIGS. 20A-20B are diagrams exemplifying structural parts for having the liquid 90 sandwiched between the light feeding member 40 and the chemically strengthened glass 200. As illustrated in FIG. 20A, by forming a hollow 40x of 10 μm deep or greater on the surface of the light feeding member 40 by polishing or etching, and by filling the hollow 40x with the liquid 90, it is possible to stably maintain the liquid 90 having the thickness of 10 μm or greater. Although the hollow 40x could have any significant depth in principle, considering the ease of processing, the depth of 500 μm or less is favorable.

Also, instead of forming the hollow 40x on the surface of the light feeding member 40, as illustrated in FIG. 20B, a land member 100 having the thickness of 10 μm or greater may be formed of metal, oxide, resin, or the like on the surface of the light feeding member 40, by using a thin film forming technology such as vacuum deposition, sputtering, or the like, so as to form a land of the liquid 90 stored in the land member 100. By storing the liquid 90 in the land member 100, it is possible to stably maintain the liquid 90 having the thickness of 10 μm or greater. Although the land member 100 could have any significant thickness in principle, considering the ease of processing, the depth of 500 μm or less is favorable.

Figure 17:
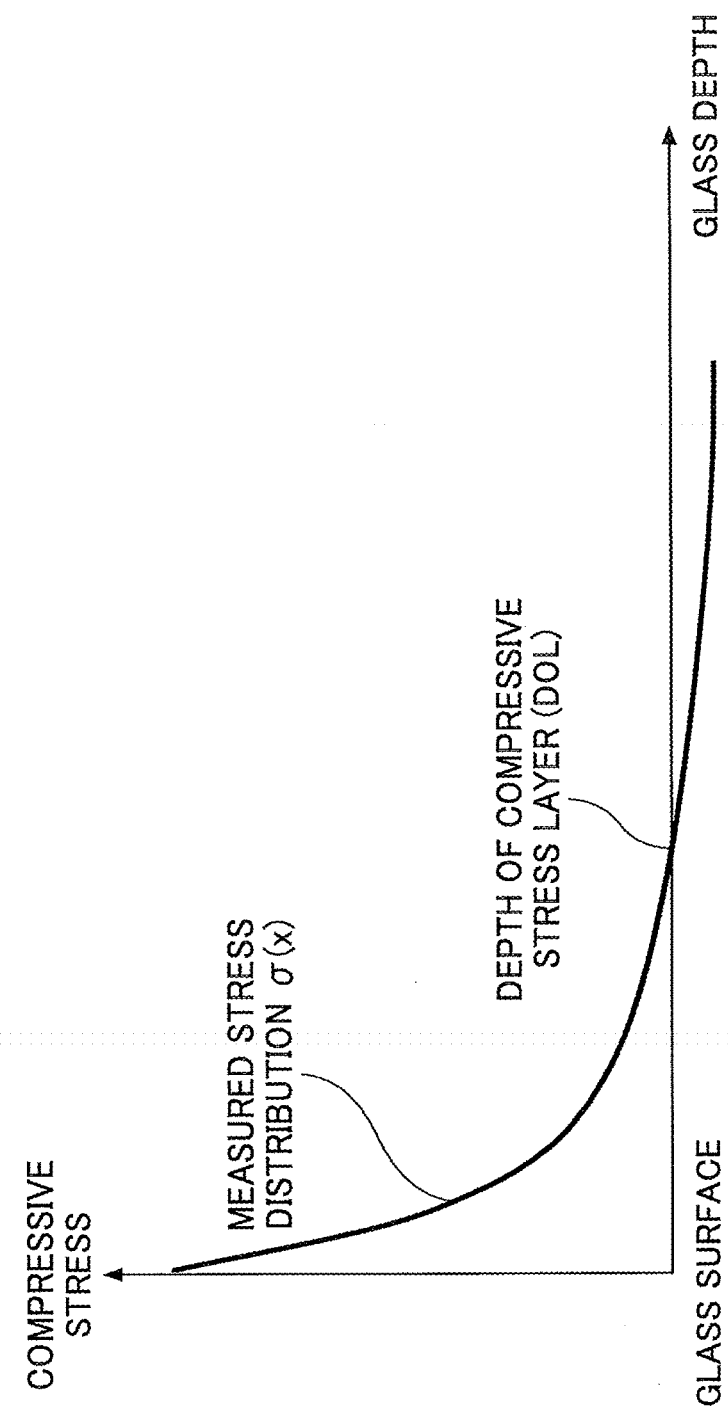
FIG. 17 is a diagram illustrating a stress distribution measured with a stress measurement device 1.

By using the above measuring device and measuring method, a stress distribution is calculated in the depth direction from the surface of a chemically strengthened glass. A stress distribution measured with a measuring device is illustrated in FIG. 17.

EXAMPLES

Examples corresponding to a chemically strengthened glass according to the embodiment will be described.

<Evaluation Method>

Various evaluations for the examples were performed by an analysis method described as follows.

(Evaluation of Glass: Surface Stress)

The stress distribution of the chemically strengthened glass of each example was calculated by the method described in the above embodiment. Specifically, the stress distribution was calculated by a method described in the above sections of <Measuring method of stress profile>.

Here, in the stress distribution, the depth of a compressive stress layer (DOL) is defined to be a minimum value of the glass depth (the unit is μm) at which the stress value becomes 0 MPa in the inside of the glass of the compressive stress layer of the chemically strengthened glass of the example, where σ(x) (MPa) represents a compressive stress at the depth x (μm) from the glass surface. Also, the internal energy density rE (kJ/m$^2$) was calculated by using Expression (3).

(Evaluation of Chemically Strengthened Glass: Fracturing Behavior)

Figure 22:
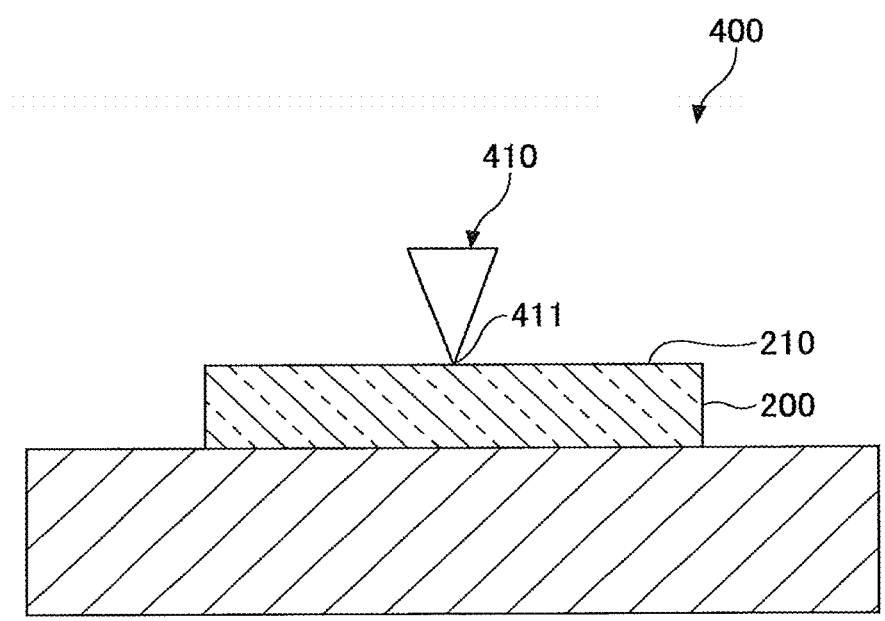
FIG. 22 is a diagram illustrating a method of observing the number of broken pieces of a chemically strengthened glass according to an embodiment.

Fracturing behavior of the chemically strengthened glass was evaluated as follows. The evaluation method is illustrated with a schematic view in FIG. 22. First, a tip part 411 of an indenter 410 was perpendicularly pressed against the surface 210 of the chemically strengthened glass under a static load condition. A Vickers hardness tester 400 called FLS-ARS9000 manufactured by FUTURE-TECH Corp. was used, to which the indenter 410 was attached. The used indenter 410 has the facing angle of 60° at the tip part 411, which was pressed against the surface 210 of the chemically strengthened glass at a rate of 60 μm/s so as to impose a load of 4 kgf (≈39.2N), and was held for 15 seconds after having reached the fully loaded state. After that, the indenter 410 was unloaded, and after 60 seconds had passed, the chemically strengthened glass 200 was observed. Then, the number of fragments of the chemically strengthened glass 200 broken by the load (the number of broken pieces) was counted to evaluate fracturing behavior of the chemically strengthened glass 200.

Examples 1 to 20

(First Chemical Strengthening Process)

Potassium nitrate ($KNO_3$) and sodium nitrate ($NaNO_3$) were put into a cup manufactured by SUS Corporation such that the total amount weighed 4000 g, and the concentration (mass %) of $KNO_3$ became each value as shown under the column of the first chemical strengthening process in Table 2. Then, the cup was heated to reach a predetermined temperature by a mantle heater, to prepare a mixed molten salt of potassium nitrate and sodium nitrate. Meanwhile, a lithium-containing aluminosilicate glass having the size of 50 mm×50 mm, and the sheet thickness being one of the different values as listed in Table 2, was preheated to reach 350° C.; then, was immersed in the molten salt for a predetermined period of time to perform an ion-exchange process; and finally, cooled down to near room temperature, to perform the first chemical strengthening process. Conditions of the first chemical strengthening process were as listed in Table 2. The obtained chemically strengthened glass was washed in water and was transferred to the following process.

The composition (by mol %) of the lithium-containing aluminosilicate glass (specific gravity: 2.44) was 69% $SiO_2$, 9% $Al_2O_3$, 6% MgO, 1% $ZrO_2$, 9.5% $Li_2O$, 4.5% $Na_2O$, and 1% $K_2O$.

(Second Chemical Strengthening Process)

Potassium nitrate ($KNO_3$) and sodium nitrate ($NaNO_3$) were put into a cup manufactured by SUS Corporation such that the total amount weighed 4000 g, and the concentration (mass %) of $KNO_3$ became each value as shown under the column of the second chemical strengthening process in Table 2. Then, the cup was heated to reach a predetermined temperature by a mantle heater, to prepare a mixed molten salt of potassium nitrate and sodium nitrate or a molten salt of 100 mol % potassium nitrate. Meanwhile, the glass to which the first chemical strengthening process had been applied was preheated to reach 350° C.; then, was immersed in the molten salt for a predetermined period of time to perform an ion-exchange process; and finally, cooled down to near room temperature, to perform the second chemical strengthening process. Conditions of the second chemical strengthening process were as listed in Table 2. The obtained chemically strengthened glass was washed in pure water several times and dried by air blowing. Thus, the chemically strengthened glasses of Examples 1 to 20 were obtained.

TABLE 2

| | | FIRST CHEMICAL STRENGTHENING PROCESS | | | SECOND CHEMICAL STRENGTHENING PROCESS | | |
|---|---|---|---|---|---|---|---|
| | SHEET THICKNESS t [μm] | $KNO_3$ CONCEN- TRATION [mass %] | STRENGTH- ENING TIME [h:min] | STRENGTH- ENING TEMPER- ATURE [° C.] | $KNO_3$ CONCEN- TRATION [mass %] | STRENGTH- ENING TIME [h:min] | STRENGTH- ENING TEMPER- ATURE [° C.] |
| EX. 1 | 500 | 0 | 0:30 | 450 | 100 | 1:30 | 450 |
| EX. 2 | 500 | 0 | 0:30 | 450 | 100 | 3:00 | 450 |
| EX. 3 | 500 | 0 | 1:00 | 450 | 100 | 1:30 | 450 |
| EX. 4 | 500 | 0 | 1:00 | 450 | 100 | 3:00 | 450 |
| EX. 5 | 500 | 0 | 3:00 | 450 | 100 | 3:00 | 450 |
| EX. 6 | 500 | 0 | 6:00 | 450 | 100 | 1:30 | 450 |
| EX. 7 | 500 | 0 | 6:00 | 450 | 100 | 3:00 | 450 |
| EX. 8 | 650 | 0 | 0:30 | 450 | 100 | 1:30 | 450 |
| EX. 9 | 650 | 0 | 0:30 | 450 | 100 | 3:00 | 450 |
| EX. 10 | 650 | 0 | 1:00 | 450 | 100 | 1:30 | 450 |
| EX. 11 | 650 | 0 | 1:00 | 450 | 100 | 3:00 | 450 |
| EX. 12 | 650 | 0 | 3:00 | 450 | 100 | 3:00 | 450 |
| EX. 13 | 650 | 0 | 6:00 | 450 | 100 | 1:30 | 450 |
| EX. 14 | 650 | 0 | 6:00 | 450 | 100 | 3:00 | 450 |
| EX. 15 | 800 | 0 | 0:30 | 450 | 100 | 1:30 | 450 |
| EX. 16 | 800 | 0 | 0:30 | 450 | 100 | 3:00 | 450 |
| EX. 17 | 800 | 0 | 1:00 | 450 | 100 | 1:30 | 450 |
| EX. 18 | 800 | 0 | 1:00 | 450 | 100 | 3:00 | 450 |
| EX. 19 | 800 | 0 | 3:00 | 450 | 100 | 3:00 | 450 |
| EX. 20 | 800 | 0 | 6:00 | 450 | 100 | 1:30 | 450 |

Comparative Examples 21-35

(First Chemical Strengthening Process)

Potassium nitrate ($KNO_3$) and sodium nitrate ($NaNO_3$) were put into a cup manufactured by SUS Corporation such that the total amount weighed 4000 g, and the concentration (mass %) of $KNO_3$ became each value as shown under the column of the first chemical strengthening process in Table 3. Then, the cup was heated to reach a predetermined temperature by a mantle heater, to prepare a mixed molten salt of potassium nitrate and sodium nitrate. Meanwhile, an aluminosilicate glass having the size of 50 mm×50 mm, and the sheet thickness being one of the different values as listed in Table 3, was preheated to reach 350° C.; then, was immersed in the molten salt for a predetermined period of time to perform an ion-exchange process; and finally, cooled down to near room temperature, to perform the first chemical strengthening process. Conditions of the first chemical strengthening process were as listed in Table 3. The obtained chemically strengthened glass was washed in water and was transferred to the following process.

The composition (by mol %) of the aluminosilicate glass (specific gravity: 2.41) was 68% $SiO_2$, 10% $Al_2O_3$, 14% $Na_2O$, and 8% MgO.

(Second Chemical Strengthening Process)

Potassium nitrate ($KNO_3$) and sodium nitrate ($NaNO_3$) were put into a cup manufactured by SUS Corporation such that the total amount weighed 4000 g, and the concentration (mass %) of $KNO_3$ became each value as shown under the column of the second chemical strengthening process in Table 3. Then, the cup was heated to reach a predetermined temperature by a mantle heater, to prepare a mixed molten salt of potassium nitrate and sodium nitrate or a molten salt of 100 mol % potassium nitrate. Meanwhile, the glass to which the first chemical strengthening process had been applied was preheated to reach 350° C.; then, was immersed in the molten salt for a predetermined period of time to perform an ion-exchange process; and finally, cooled down to near room temperature, to perform the second chemical strengthening process. Conditions of the second chemical strengthening process were as listed in Table 3. The obtained chemically strengthened glass was washed in pure water several times and dried by air blowing. Thus, the chemically strengthened glasses of Comparative examples 21 to 35 were obtained.

TABLE 3

| | | FIRST CHEMICAL STRENGTHENING PROCESS | | | SECOND CHEMICAL STRENGTHENING PROCESS | | |
|---|---|---|---|---|---|---|---|
| | SHEET THICKNESS t [μm] | $KNO_3$ CONCEN-TRATION [mass %] | STRENGTH-ENING TIME [h:min] | STRENGTH-ENING TEMPER-ATURE [° C.] | $KNO_3$ CONCEN-TRATION [mass %] | STRENGTH-ENING TIME [h:min] | STRENGTH-ENING TEMPER-ATURE [° C.] |
| COMP. EX. 21 | 400 | 50 | 27:00 | 450 | 100 | 5:40 | 425 |
| COMP. EX. 22 | 400 | 50 | 55:00 | 450 | 99.5 | 3:00 | 425 |
| COMP. EX. 23 | 400 | 50 | 55:00 | 450 | 95 | 0:20 | 425 |
| COMP. EX. 24 | 400 | 50 | 27:00 | 450 | 96 | 6:20 | 400 |
| COMP. EX. 25 | 550 | 50 | 55:00 | 450 | 99 | 1:20 | 425 |
| COMP. EX. 26 | 550 | 50 | 55:00 | 450 | 99.5 | 3:00 | 425 |
| COMP. EX. 27 | 550 | 50 | 55:00 | 450 | 100 | 5:40 | 425 |
| COMP. EX. 28 | 550 | 50 | 55:00 | 450 | 96 | 0:50 | 450 |
| COMP. EX. 29 | 800 | 50 | 55:00 | 450 | 96 | 6:00 | 425 |
| COMP. EX. 30 | 800 | 50 | 55:00 | 450 | 96.5 | 5:15 | 450 |
| COMP. EX. 31 | 1000 | 50 | 55:00 | 450 | 99 | 6:00 | 400 |
| COMP. EX. 32 | 1000 | 50 | 55:00 | 450 | 99.5 | 6:00 | 425 |
| COMP. EX. 33 | 1000 | 50 | 55:00 | 450 | 100 | 9:25 | 425 |
| COMP. EX. 34 | 1000 | 50 | 27:00 | 450 | 99 | 6:00 | 400 |
| COMP. EX. 35 | 1000 | 50 | 14:00 | 450 | 96 | 5:10 | 450 |

Various evaluations were performed for the chemically strengthened glasses obtained in this way. Also, from σ(x) (unit: MPa), DOL value, and the sheet thickness t (unit: μm) that were obtained by the evaluations, rE value (unit: $kJ/m^2$) based on Expression (3) was calculated.

TABLE 4

| | SHEET THICKNESS t [μm] | DOL [μm] | rE [kJ/m²] | BROKEN PIECE COUNT [PIECES] | $rE_{limit0}$ [kJ/m²] | $rE_{limit}$ [kJ/m²] | $C_0$ [—] | C [—] |
|---|---|---|---|---|---|---|---|---|
| EX. 1  | 500 | 94  | 8    | 2  | 26.7 | 11   | 0.3  | 0.73 |
| EX. 2  | 500 | 78  | 8.7  | 2  | 26.7 | 11   | 0.33 | 0.79 |
| EX. 3  | 500 | 99  | 9.3  | 2  | 26.7 | 11   | 0.35 | 0.84 |
| EX. 4  | 500 | 79  | 8.1  | 2  | 26.7 | 11   | 0.3  | 0.73 |
| EX. 5  | 500 | 82  | 9.1  | 2  | 26.7 | 11   | 0.34 | 0.83 |
| EX. 6  | 500 | 95  | 9.6  | 2  | 26.7 | 11   | 0.36 | 0.87 |
| EX. 7  | 500 | 78  | 10   | 3  | 26.7 | 11   | 0.37 | 0.91 |
| EX. 8  | 650 | 121 | 9.7  | 3  | 30.2 | 13.4 | 0.32 | 0.73 |
| EX. 9  | 650 | 115 | 9    | 2  | 30.2 | 13.4 | 0.3  | 0.67 |
| EX. 10 | 650 | 127 | 11.9 | 2  | 30.2 | 13.4 | 0.4  | 0.89 |
| EX. 11 | 650 | 128 | 8.9  | 2  | 30.2 | 13.4 | 0.29 | 0.66 |
| EX. 12 | 650 | 136 | 10.1 | 2  | 30.2 | 13.4 | 0.34 | 0.76 |
| EX. 13 | 650 | 137 | 13.5 | 69 | 30.2 | 13.4 | 0.45 | 1.01 |
| EX. 14 | 650 | 132 | 11.2 | 3  | 30.2 | 13.4 | 0.37 | 0.83 |
| EX. 15 | 800 | 132 | 13.9 | 2  | 33.7 | 15.8 | 0.41 | 0.88 |
| EX. 16 | 800 | 140 | 10.2 | 2  | 33.7 | 15.8 | 0.3  | 0.65 |
| EX. 17 | 800 | 150 | 13.7 | 2  | 33.7 | 15.8 | 0.41 | 0.87 |
| EX. 18 | 800 | 146 | 12.4 | 2  | 33.7 | 15.8 | 0.37 | 0.78 |
| EX. 19 | 800 | 167 | 14.3 | 2  | 33.7 | 15.8 | 0.43 | 0.91 |
| EX. 20 | 800 | 154 | 16.8 | 86 | 33.7 | 15.8 | 0.5  | 1.06 |

TABLE 5

| | SHEET THICKNESS t [μm] | DOL [μm] | rE [kJ/m²] | BROKEN PIECE COUNT [PIECES] | $rE_{limit0}$ [kJ/m²] | $rE_{limit}$ [kJ/m²] | $C_0$ [—] | C [—] |
|---|---|---|---|---|---|---|---|---|
| COMP. EX. 21 | 400  | 49 | 32.7 | 1504 | 24.3 | 9.4  | 1.34 | 3.47 |
| COMP. EX. 22 | 400  | 53 | 26.7 | 1592 | 24.3 | 9.4  | 1.1  | 2.84 |
| COMP. EX. 23 | 400  | 69 | 14.6 | 4    | 24.3 | 9.4  | 0.6  | 1.55 |
| COMP. EX. 24 | 400  | 52 | 22   | 2    | 24.3 | 9.4  | 0.9  | 2.34 |
| COMP. EX. 25 | 550  | 75 | 23.9 | 4    | 27.8 | 11.8 | 0.86 | 2.02 |
| COMP. EX. 26 | 550  | 67 | 29.8 | 356  | 27.8 | 11.8 | 1.07 | 2.53 |
| COMP. EX. 27 | 550  | 63 | 35   | 1525 | 27.8 | 11.8 | 1.26 | 2.97 |
| COMP. EX. 28 | 550  | 77 | 22.2 | 4    | 27.8 | 11.8 | 0.8  | 1.88 |
| COMP. EX. 29 | 800  | 89 | 29   | 4    | 33.7 | 15.8 | 0.86 | 1.84 |
| COMP. EX. 30 | 800  | 84 | 39.9 | 280  | 33.7 | 15.8 | 1.19 | 2.53 |
| COMP. EX. 31 | 1000 | 92 | 34.5 | 3    | 38.3 | 19   | 0.9  | 1.82 |
| COMP. EX. 32 | 1000 | 93 | 42.4 | 68   | 38.3 | 19   | 1.11 | 2.23 |
| COMP. EX. 33 | 1000 | 82 | 47.7 | 244  | 38.3 | 19   | 1.24 | 2.51 |
| COMP. EX. 34 | 1000 | 74 | 31.9 | 2    | 38.3 | 19   | 0.83 | 1.68 |
| COMP. EX. 35 | 1000 | 64 | 36.1 | 2    | 38.3 | 19   | 0.94 | 1.9  |

Figure 23:
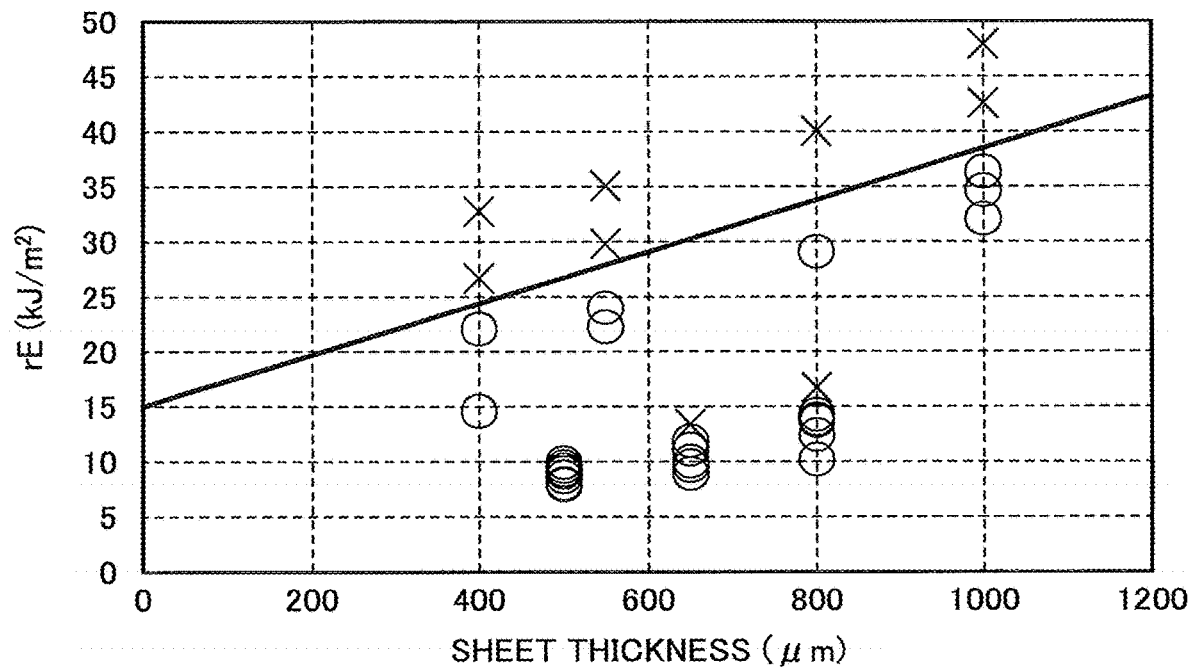
FIG. 23 is a diagram illustrating a relationship between the sheet thickness and the rE value of a chemically strengthened glass, along with conventional $rE_{limit}$.
Figure 24:
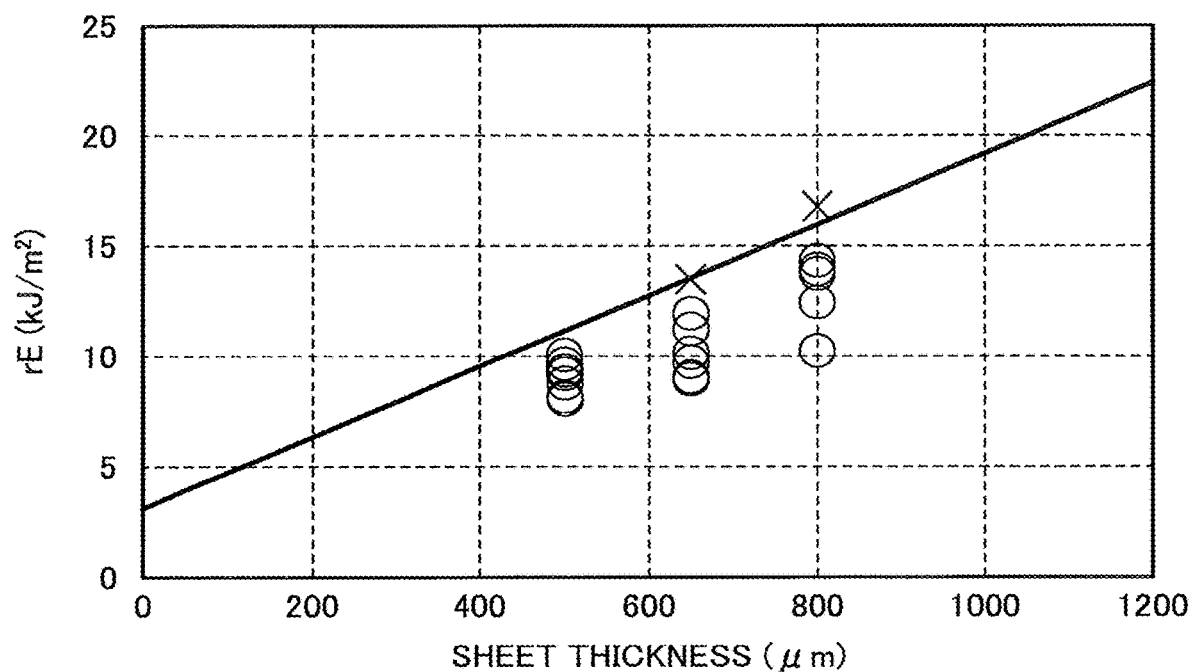
FIG. 24 is a diagram illustrating a relationship between the sheet thickness and the rE value of a lithium-containing aluminosilicate glass as a chemically strengthened glass, along with new $rE_{limit}$.

Also, for each of the samples in Table 4 and Table 5, the relationship between the sheet thickness and the rE value was plotted as illustrated in FIG. 23 and FIG. 24. A circle mark indicates a sample whose number of broken pieces was less than 15, and a cross mark indicates a sample whose number of broken pieces was greater than or equal to 15, when broken with the evaluation device in FIG. 22.

In FIG. 23, in addition to the relationship between the sheet thickness and the rE value from Table 4 and Table 5, the upper limit of the internal energy density rE described in Reference 1 is added as $rE_{limit0}=23.3 \times t/1000+15$ ($kJ/m^2$). However, it was understood that the number of broken pieces tended to increase when a chemically strengthened glass was fractured even though the internal energy density rE of the chemically strengthened glass did not exceed the conventional critical value.

In other words, representing the ratio $rE/rE_{limit0}$ of the internal energy to its limit value by $C_0$, for an aluminosilicate glass, the number of broken pieces exceeds 15 when $C_0$ exceeds 1 as in Table 5, whereas for a lithium-containing aluminosilicate glass, the number of broken pieces exceeds 15 without $C_0$ exceeding 1 as in Table 4 (see Example 13 and Example 20).

Thereupon, critical values $rE_{limit}$ of the internal energy, which can be applied only to lithium-containing aluminosilicate glasses, were derived. The numerical values of $rE_{limit}$ can be connected by a straight line, and for a chemically strengthened glass of a lithium-containing aluminosilicate glass having the internal energy density exceeding this line, the number of broken pieces turned out to be greater.

Thereupon, in the present specification, the upper limit of the internal energy density rE of chemically strengthened glasses of lithium-containing aluminosilicate glasses is defined as $rE_{limit}=16 \times t/1000+3$ (kJ/m$^2$). The internal energy density rE satisfying Expression (4) described above is favorable because such a glass is less likely to scatter in fine fragments when the glass breaks.

This condition was found out by the inventors of the present application as a result of diligent examination, which represents the upper limit of the internal energy density rE value of a chemically strengthened glass. This upper limit can be applied to a chemically strengthened glass to which chemical strengthening has been applied twice as in Examples, which does not have a profile following the complementary error function.

From this result, fracturing behavior of a chemically strengthened glass can be managed by controlling the internal energy density rE to be contained within a range of numerical values that satisfy Expression (4). Since a greater rE enables to make a glass having a greater strength, with the notation of $rE/rE_{limit}=C$, C is favorably less than 1 and in addition, 0.7 or greater, more favorably 0.8 or greater, or further favorably 0.9 or greater.

As above, preferable embodiments and examples have been described in detail. Note that the present invention is not limited to the above embodiments and examples, and various changes and replacements can be made in the above embodiments and examples without deviating from the scope of the present invention described in the claims. Also, the above embodiments can be properly combined.

The invention claimed is:

1. A chemically strengthened glass obtained by chemically strengthening a lithium-containing aluminosilicate glass, wherein representing a sheet thickness of the chemically strengthened glass by t (μm) and an internal stress at a depth x (μm) from a surface of the chemically strengthened glass by σ(x) (MPa), the chemically strengthened glass has a value of a ratio $C=rE/rE_{limit}$ being greater than or equal to 0.7 and less than 1.0 where rE (kJ/m$^2$) is calculated from a following Expression (3) and $rE_{limit}=16 \times t/1000+3$, wherein $rE_{limit}$ is expressed in kJ/m$^2$ $$rE = \frac{2 \times \int_{DOL}^{t/2} |\sigma(x)| dx \times (t - 2 \times DOL)}{1000 \times t} \quad (3)$$

where DOL represents a depth (μm) of a compressive stress layer of the chemically strengthened glass, wherein DOL representing the depth of the compressive stress layer is greater than or equal to 85 μm, wherein a position at which a half value (HW) of a surface compressive stress CS is less than 8 μm.

2. The chemically strengthened glass as claimed in claim 1, wherein the surface compressive stress CS is greater than or equal to 600 MPa.

3. The chemically strengthened glass as claimed in claim 1, wherein DOL representing the depth of the compressive stress layer is greater than or equal to 90 μm.

4. The chemically strengthened glass as claimed in claim 1, wherein DOL representing the depth of the compressive stress layer is greater than or equal to 95 μm.

5. The chemically strengthened glass as claimed in claim 1, wherein the sheet thickness t is less than or equal to 1500 μm.

6. The chemically strengthened glass as claimed in claim 2, wherein the sheet thickness t is less than or equal to 1500 μm.

7. The chemically strengthened glass as claimed in claim 3, wherein the sheet thickness t is less than or equal to 1500 μm.

8. The chemically strengthened glass as claimed in claim 4, wherein the sheet thickness t is less than or equal to 1500 μm.

9. The chemically strengthened glass as claimed in claim 1, wherein DOL representing the depth of the compressive stress layer is greater than or equal to 100 μm.

10. The chemically strengthened glass as claimed in claim 1, wherein the chemically strengthened glass has a value of a ratio $C=rE/rE_{limit}$ being greater than or equal to 0.84 and less than 1.0.

11. The chemically strengthened glass as claimed in claim 1, wherein the chemically strengthened glass has a value of a ratio $C=rE/rE_{limit}$ being greater than or equal to 0.87 and less than 1.0.

12. The chemically strengthened glass as claimed in claim 1, wherein the chemically strengthened glass has a value of a ratio $C=rE/rE_{limit}$ being greater than or equal to 0.90 and less than 1.0.

13. The chemically strengthened glass as claimed in claim 1, wherein a position at which a half value (HW) of a surface compressive stress CS is less than or equal to 6 μm.

14. The chemically strengthened glass as claimed in claim 1, wherein a position at which a half value (HW) of a surface compressive stress CS is less than or equal to 5 μm.

15. A chemically strengthened glass obtained by chemically strengthening a lithium-containing aluminosilicate glass, wherein representing a sheet thickness of the chemically strengthened glass by t (μm) and an internal stress at a depth x (μm) from a surface of the chemically strengthened glass by σ(x) (MPa), the chemically strengthened glass has a value of a ratio $C=rE/rE_{limit}$ being greater than or equal to 0.7 and less than 1.0 where rE (kJ/m$^2$) is calculated from a following Expression (3) and $rE_{limit}=16 \times t/1000+3$, wherein $rE_{limit}$ is expressed in kJ/m$^2$, and a stress value at a half depth of a DOL value of the glass is 10% or less, with respect to a surface stress value, $$rE = \frac{2 \times \int_{DOL}^{t/2} |\sigma(x)| dx \times (t - 2 \times DOL)}{1000 \times t} \quad (3)$$

where DOL represents a depth (μm) of a compressive stress layer of the chemically strengthened glass, wherein DOL representing the depth of the compressive stress layer is greater than or equal to 85 μm, wherein a position at which a half value (HW) of a surface compressive stress CS is less than 8 μm.

16. The chemically strengthened glass as claimed in claim 15, wherein the surface compressive stress CS is greater than or equal to 600 MPa.

17. The chemically strengthened glass as claimed in claim 15, wherein DOL representing the depth of the compressive stress layer is greater than or equal to 90 μm.

18. The chemically strengthened glass as claimed in claim 15, wherein DOL representing the depth of the compressive stress layer is greater than or equal to 95 μm.

19. The chemically strengthened glass as claimed in claim 15, wherein the sheet thickness t is less than or equal to 1500 μm.

20. The chemically strengthened glass as claimed in claim 15, wherein DOL representing the depth of the compressive stress layer is greater than or equal to 100 μm.

* * * * *